United States Patent
Yoshimoto et al.

(10) Patent No.: US 10,848,260 B2
(45) Date of Patent: Nov. 24, 2020

(54) BASE STATION APPARATUS, TERMINAL APPARATUS, AND COMMUNICATION METHOD FOR THE SAME

(71) Applicants: SHARP KABUSHIKI KAISHA, Osaka (JP); FG Innovation Company Limited, Hong Kong (CN)

(72) Inventors: Takashi Yoshimoto, Sakai (JP); Jungo Goto, Sakai (JP); Osamu Nakamura, Sakai (JP); Yasuhiro Hamaguchi, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/331,930

(22) PCT Filed: Aug. 29, 2017

(86) PCT No.: PCT/JP2017/030873
§ 371 (c)(1),
(2) Date: Mar. 8, 2019

(87) PCT Pub. No.: WO2018/061572
PCT Pub. Date: Apr. 5, 2018

(65) Prior Publication Data
US 2019/0245640 A1    Aug. 8, 2019

(30) Foreign Application Priority Data

Sep. 29, 2016  (JP) .................................. 2016-191057

(51) Int. Cl.
*H04J 11/00*    (2006.01)
*H04W 72/12*   (2009.01)
(Continued)

(52) U.S. Cl.
CPC ........ *H04J 11/0086* (2013.01); *H04B 1/7083* (2013.01); *H04J 11/0079* (2013.01);
(Continued)

(58) Field of Classification Search
CPC .... H04J 11/0086; H04J 13/18; H04J 11/0079; H04J 2203/0069; H04L 27/26;
(Continued)

(56) References Cited

U.S. PATENT DOCUMENTS

2014/0233528 A1* 8/2014 Webb .................... H04L 5/0094
370/330
2014/0376356 A1* 12/2014 Park .................. H04W 72/0413
370/203
(Continued)

OTHER PUBLICATIONS

"3rd Generation Partnership Project; Technical Specification Group Radio Access Network; Study on Scenarios and Requirements for Next Generation AccessTechnologies;(Release 14)" 3GPP TR 38.913 V0. 3. 0 (Mar. 2016).
(Continued)

*Primary Examiner* — Sharad Rampuria
(74) *Attorney, Agent, or Firm* — ScienBiziP, P.C.

(57) ABSTRACT

A base station apparatus, a terminal apparatus, and a communication method are provided that are capable of suppressing an increase in processing loads for identification of each terminal apparatus and signal detection for uplink data, a decrease in identification accuracy, and an increase in control information for identification of the terminal apparatus in a multiple access using grant free. A terminal apparatus for communicating with a base station apparatus includes a receiver configured to receive a multi-access signature process index from the base station apparatus, and a transmitter configured to transmit a demodulation reference signal and an uplink physical channel. The multi-access signature process index is information indicating association
(Continued)

of a mark identifying the uplink physical channel transmitted by grant free access. The transmitter transmits the uplink physical channel processed based on the mark identifying the uplink physical channel and associated with the demodulation reference signal.

6 Claims, 18 Drawing Sheets

(51) Int. Cl.
| | |
|---|---|
| H04B 1/7083 | (2011.01) |
| H04J 13/18 | (2011.01) |
| H04W 72/04 | (2009.01) |
| H04W 72/08 | (2009.01) |
| H04L 27/26 | (2006.01) |
| H04W 4/70 | (2018.01) |
| H04W 74/08 | (2009.01) |

(52) U.S. Cl.
CPC ............ *H04J 13/18* (2013.01); *H04L 27/26* (2013.01); *H04W 72/04* (2013.01); *H04W 72/1284* (2013.01); *H04W 74/08* (2013.01); *H04B 2201/70713* (2013.01); *H04W 4/70* (2018.02)

(58) Field of Classification Search
CPC ........ H04B 1/7083; H04B 2201/70713; H04B 7/2121; H04B 7/2123; H04Q 2213/394; H04W 72/04; H04W 72/12; H04W 76/00; H04W 74/08; H04W 72/1284; H04W 4/70
See application file for complete search history.

(56) References Cited

U.S. PATENT DOCUMENTS

2015/0326362 A1* 11/2015 Xiong ................ H04W 4/70
370/336
2019/0268924 A1* 8/2019 Kim ................ H04L 5/0094

OTHER PUBLICATIONS

ZTE et al., "WF on Scenarios for Multiple Access", R1-165595, 3GPP TSG RAN WG1#85 Meeting, Nanjing, China, May 23-27, 2016.
LG Electronics, "General procedures for grant-free/grant-based MA", 3GPP TSG RAN WG1 Meeting #86bis R1-1609228, Lisbon, Portugal Oct. 10-14, 2016.
Intel Corporation: "Grant-less and non-orthogonal UL transmissions in NR", 3GPP Draft; R1-167698, 3GPP TSG-RAN WG1 #86, Gothenburg, Sweden, Aug. 22-26, 2016.
NTT Docomo et al: "Discussion on multiple access or UL mMTC",3GPP Draft;R1-167392_MA_MMTC,3rd Generation Partnership Project(3GPP),Mobile Competence Centre; 650,Route des Lucioules;F-06921 Sophia-Antipolis Cedex;France,vol. RAN WG1,No. Gothenburg, Sweden;20160822-20160826,Aug. 21, 2016(Aug. 21, 2016),XP051125880,Retrieved from the Internet: URL:http://www.3gpp.org/ftp/Meetings_3GPP_SYNC/RAN1/Docs/, [retrieved on Aug. 21, 2016]"Sect. 5".
Nokia et al, "Non-orthogonal coded access(NOCA)",3GPP Draft;R1-167249,3rd Generation Partnership Project(3GPP),Mobile Competence Centre;650,Route Des Lucioules;F-06921 Sophia-Antipolis Cedex;France,vol. RAN WG1,No.Gothenburg,Sweden;20160822-20160826,Aug. 21, 2016(Aug. 21, 2016), XP051125791.Retrieved from the Internet: URL:http://www.3gpp.org/ftp/Meetings_3GPP_SYNC/RAN1/Docs/,[retrieved on Aug. 21, 2016]*Sect. 2*.

* cited by examiner

| MA signature process index | DMRS index | Spreading Code index |
|---|---|---|
| 0 | 0 | 0 |
| 1 | 1 | 1 |
| 2 | 2 | 2 |
| 3 | 3 | 3 |
| 4 | 4 | 0 |
| 5 | 5 | 1 |
| 6 | 6 | 2 |
| 7 | 7 | 3 |

FIG. 6

| DMRS index ($N_{DMRS}$=16) | Cyclic Shift Index/OCC index |
| --- | --- |
| 0 | Cyclic Shift Index=0 |
| 1 | Cyclic Shift Index=1 |
| 2 | Cyclic Shift Index=2 |
| 3 | Cyclic Shift Index=3 |
| 4 | Cyclic Shift Index=4 |
| 5 | Cyclic Shift Index=5 |
| 6 | Cyclic Shift Index=6 |
| 7 | Cyclic Shift Index=7 |

FIG. 7

| MA signature process index | DMRS index | Spreading Code index |
|---|---|---|
| 0 | 0 | 0 |
| 1 | 1 | 1 |
| 2 | 2 | 2 |
| 3 | 3 | 3 |
| 4 | 4 | 0 |
| 5 | 5 | 1 |
| 6 | 6 | 2 |
| 7 | 7 | 3 |
| 8 | 8 | 0 |
| ⋮ | ⋮ | ⋮ |
| 14 | 14 | 2 |
| 15 | 15 | 3 |

FIG. 8

| DMRS index ($N_{DMRS}=16$) | Cyclic Shift Index / OCC index |
|---|---|
| 0 | Cyclic Shift Index=0, OCC index=0 |
| 1 | Cyclic Shift Index=0, OCC index=1 |
| 2 | Cyclic Shift Index=1, OCC index=0 |
| 3 | Cyclic Shift Index=1, OCC index=1 |
| 4 | Cyclic Shift Index=2, OCC index=0 |
| 5 | Cyclic Shift Index=2, OCC index=1 |
| 6 | Cyclic Shift Index=3, OCC index=0 |
| ⋮ | ⋮ |
| 15 | Cyclic Shift Index=7, OCC index=1 |

FIG. 9

| MA signature process index | DMRS index | Spreading Code index0 | Spreading Code index1 |
|---|---|---|---|
| 0 | 0 | 0 | 1 |
| 1 | 1 | 2 | 3 |
| 2 | 2 | 0 | 1 |
| 3 | 3 | 2 | 3 |
| 4 | 4 | 0 | 1 |
| 5 | 5 | 2 | 3 |
| 6 | 6 | 0 | 1 |
| 7 | 7 | 2 | 3 |
| 8 | 8 | 0 | 1 |
| ⋮ | ⋮ | ⋮ | ⋮ |
| 14 | 14 | 0 | 1 |
| 15 | 15 | 2 | 3 |

FIG. 10

| MA signature process index | DMRS index | Spreading Code index | Tx power Index |
|---|---|---|---|
| 0 | 0 | 0 | 0 |
| 1 | 0 | 0 | 1 |
| 2 | 1 | 1 | 0 |
| 3 | 1 | 1 | 1 |
| 4 | 2 | 2 | 0 |
| 5 | 2 | 2 | 1 |
| 6 | 3 | 3 | 0 |
| 7 | 3 | 3 | 1 |
| 8 | 4 | 1 | 0 |
| 9 | 4 | 1 | 1 |
| ⋮ | ⋮ | ⋮ | ⋮ |
| 30 | 15 | 3 | 0 |
| 31 | 15 | 3 | 1 |

FIG. 14

| MA signature process index | DMRS index | Spreading Code index0 | Spreading Code index1 | Spreading Code index2 |
|---|---|---|---|---|
| 0 | 0 | 0 | 1 | 2 |
| 1 | 1 | 1 | 2 | 3 |
| 2 | 2 | 2 | 3 | 0 |
| 3 | 3 | 3 | 0 | 1 |
| 4 | 4 | 0 | 1 | 2 |
| 5 | 5 | 1 | 2 | 3 |
| 6 | 6 | 2 | 3 | 0 |
| 7 | 7 | 3 | 0 | 1 |
| 8 | 8 | 0 | 1 | 2 |
| ⋮ | ⋮ | ⋮ | ⋮ | ⋮ |
| 14 | 14 | 2 | 3 | 0 |
| 15 | 15 | 3 | 0 | 1 |

FIG. 16

| MA signature process index | DMRS index | Spreading Code index | UE ID |
|---|---|---|---|
| 0 | 0 | 0 | 0 |
| 1 | 1 | 1 | 1 |
| 2 | 2 | 2 | 2 |
| 3 | 3 | 3 | 3 |
| 4 | 4 | 0 | 4 |
| 5 | 5 | 1 | 5 |
| 6 | 6 | 2 | 6 |
| 7 | 7 | 3 | 7 |
| 8 | 8 | 0 | 8 |
| ⋮ | ⋮ | ⋮ | ⋮ |
| 14 | 14 | 2 | 14 |
| 15 | 15 | 3 | 15 |

FIG. 17

| MA signature process index | DMRS index | Spreading Code index | UE ID Gr | UE ID |
|---|---|---|---|---|
| 0 | 0 | 0 | 0 | {0,1,2,3} |
| 1 | 1 | 1 | 1 | {4,5,6,7} |
| 2 | 2 | 2 | 2 | {8,9,10,11} |
| 3 | 3 | 3 | 3 | {12,13,14,15} |
| 4 | 4 | 0 | 4 | {16,17,18,19} |
| 5 | 5 | 1 | 5 | {20,21,22,23} |
| 6 | 6 | 2 | 6 | {24,25,26,27} |
| 7 | 7 | 3 | 7 | {28,29,30,31} |
| 8 | 8 | 0 | 8 | {32,33,34,35} |
| ⋮ | ⋮ | ⋮ | ⋮ | ⋮ |
| 14 | 14 | 2 | 14 | {56,57,58,59} |
| 15 | 15 | 3 | 15 | {60,61,62,63} |

FIG. 18

BASE STATION APPARATUS, TERMINAL APPARATUS, AND COMMUNICATION METHOD FOR THE SAME

TECHNICAL FIELD

The present invention relates to a base station apparatus, a terminal apparatus, and a communication method for the same.

BACKGROUND ART

In communication systems such as Long Term Evolution (LTE) and LTE-Advanced (LTE-A), specified by Third Generation Partnership Project (3GPP), terminal apparatuses (User Equipment (UE)) use a Scheduling Request (SR) or the like to request, to a base station apparatus (evolved Node B (eNodeB), a radio resource for transmission of uplink data. The base station apparatus provides a UL Grant to each terminal apparatus, based on the SR or BSR. In a case of receiving control information about the UL Grant from the base station apparatus, the terminal apparatus uses a prescribed radio resource to transmit uplink data, based on uplink transmission parameters included in the UL Grant (the transmission is referred to as scheduled access or grant-based access). In this manner, the base station apparatus controls all uplink data transmissions (the base station apparatus knows radio resources for uplink data transmitted by each terminal apparatus). In the scheduled access, the base station apparatus controls uplink radio resources to realize Orthogonal Multiple Access (OMA).

3GPP is making efforts to specify radio access technology for realizing Massive Machine Type Communications (mMTC) as a fifth generation mobile communication method (5G) (NPL 1). mMTC assumes that a large number of devices such as terminal apparatuses and sensors transmit and/or receive small data. For uplink mMTC, multiple accesses using grant free (grant free access) are being studied (NPL 2). In the grant free access, a terminal apparatus transmits uplink data to the base station apparatus without reception of the UL Grant or the like. Thus, the grant free access allows suppression of an increase in overhead resulting from control information even in a case that a large number of devices transmit small-sized data. Moreover, the grant free access involves no reception of the UL Grant or the like, enabling a reduction in time from generation until transmission of transmit data.

CITATION LIST

Non Patent Literature

NPL 1: "3rd Generation Partnership Project; Technical Specification Group Radio Access Network; Study on Scenarios and Requirements for Next Generation Access Technologies; (Release 14)" 3GPP TR 38.913 v0 3 0 (2016-03).

NPL 2: R1-165595, 3GPP TSG RAN WG1#85 Meeting, Nanjing, China, May 23-27, 2016

SUMMARY OF INVENTION

Technical Problem

In the grant free access, each terminal apparatus transmits uplink data regardless of the UL Grant, thus allowing non-orthogonal spatial multiplexing of uplink data transmitted from terminal apparatuses that are larger in number than receive antennas of the base station apparatus. Furthermore, in a case that uplink data is multiplied by a spreading code, uplink data transmitted from terminal apparatuses, the number of which is larger than a spreading rate, is allowed to be code-multiplexed in a non-orthogonal manner in the same radio resource (the code multiplexing is referred to as Non-Orthogonal Multiple Access (NOMA)). However, in the grant free access, the base station apparatus receives, from each terminal apparatus, uplink data for which radio resource allocation and the like are not controlled (uplink data for which the base station apparatus does not know which of uplink resources is used for transmission). Thus, the base station apparatus identifies each terminal apparatus (user identification) through a process of signal detection, demodulation, decoding processing for uplink data from the terminal apparatus. Therefore, the base station apparatus encounters problems of an increase in processing loads for identification of each terminal apparatus connected based on the non-orthogonal multiple access and for signal detection for uplink data, a decrease in identification accuracy, and an increase in control information for identification of the terminal apparatus.

The present invention has been made is view of these circumstances, and an object of the present invention is to provide a base station apparatus, a terminal apparatus and a communication method capable of inhibiting an increase in processing loads for identification of each terminal apparatus and signal detection for uplink data, a decrease in identification accuracy, and an increase in control information for identification of the terminal apparatus in a multiple access using grant free.

Solution to Problem

To address the above-mentioned drawbacks, a base station apparatus, a terminal apparatus, and a communication method according to the present invention are configured as follows.

(1) An aspect of the present invention is a terminal apparatus for communicating with a base station apparatus, the terminal apparatus including: a receiver configured to receive a multi-access signature process index from the base station apparatus; and a transmitter configured to transmit a demodulation reference signal and an uplink physical channel, wherein the multi-access signature process index is information indicating association of a mark identifying the uplink physical channel transmitted by grant free access, and the transmitter transmits the uplink physical channel processed based on the mark identifying the uplink physical channel and associated with the demodulation reference signal.

(2) In an aspect of the present invention, the multi-access signature process index is indicative of a configuration varying the association of the demodulation reference signal with the mark identifying the uplink physical channel based on a cell ID configured for communication with the base station apparatus.

(3) In an aspect of the present invention, the mark identifying the uplink physical channel includes a spreading code sequence, and the transmitter transmits the uplink physical channel multiplied by the spreading code sequence associated with the demodulation reference signal.

(4) In an aspect of the present invention, the mark identifying the uplink physical channel includes an interleave pattern, and the transmitter transmits the uplink physical channel interleaved in association with the demodulation reference signal.

(5) In an aspect of the present invention, the mark identifying the uplink physical channel includes uplink transmit power, and the transmitter transmits the uplink physical channel controlled by the transmit power associated with the demodulation reference signal.

(6) In an aspect of the present invention, the multi-access signature process index uniquely associates the demodulation reference signal with the spreading code sequence.

(7) In an aspect of the present invention, the multi-access signature process index associates one demodulation reference signal with multiple spreading code sequences, the transmitter transmits the uplink physical channel multiplied by one spreading code sequence selected from the multiple spreading code sequences, and the spreading code sequence by which the uplink physical channel is multiplied during retransmission is different from the spreading code sequence by which the uplink physical channel is multiplied during initial transmission.

(8) In an aspect of the present invention, the receiver receives a UE ID from the base station apparatus, the multi-access signature process index is indicative of the mark identifying the uplink physical channel, a UE ID group, and association and the UE ID group includes multiple UE IDs including the UE ID.

(9) An aspect of the present invention is a communication method for a terminal apparatus for communicating with a base station apparatus, the communication method including: a first step of receiving a multi-access signature process index from the base station apparatus; and a second step of transmitting a demodulation reference signal and an uplink physical channel, wherein the multi-access signature process index is information indicating association of a mark identifying the uplink physical channel transmitted by grant free access, and the second step includes transmitting the uplink physical channel processed based on the mark identifying the uplink physical channel and associated with the demodulation reference signal.

(10) An aspect of the present invention is a base station apparatus for communicating with a terminal apparatus, the base station apparatus including: a transmitter configured to transmit a multi-access signature process index to the terminal apparatus and a receiver configured to receive a demodulation reference signal and an uplink physical channel, wherein the multi-access signature process index is information indicating association of a mark identifying the uplink physical channel transmitted by the transmitter by grant free access, and the receiver performing reception of the uplink physical channel processing based on the mark identifying the uplink physical channel and associated with the demodulation reference signal.

(11) An aspect of the present invention is a communication method for a base station apparatus for communicating with a terminal apparatus, the communication method including: a first step of transmitting a multi-access signature process index to the terminal apparatus; and a second step of receiving a demodulation reference signal and an uplink physical channel, wherein the multi-access signature process index is information indicating association of a mark identifying the uplink physical channel transmitted by the terminal apparatus by grant free access, and the reception step includes performing reception processing of receiving the uplink physical channel based on the mark identifying the uplink physical channel and associated with the demodulation reference signal.

Advantageous Effects of Invention

According to one or more aspects of the present invention, in multiple accesses using grant free, an increase in processing loads for identification of each terminal apparatus and signal detection for uplink data, a decrease in identification accuracy, and an increase in control information for identification of the terminal apparatus can be suppressed.

BRIEF DESCRIPTION OF DRAWINGS

FIG. 6 is an example of a table indicating association of configuration parameters in grant free access according to the first embodiment.

FIG. 7 is an example in which a demodulation reference signal index is associated with a cyclic index/OCC index according to the first embodiment.

FIG. 8 is another example of a table indicating association of the configuration parameters in the grant free access according to the present embodiment according to the first embodiment.

FIG. 9 is another example in which the demodulation reference signal index is associated with the cyclic index/OCC index according to the present embodiment according to the first embodiment.

FIG. 10 is another example of a table indicating association of the configuration parameters in the grant free access according to the present embodiment according to the first embodiment.

FIG. 14 is an example of a table indicating association of the configuration parameters in the grant free access according to a second embodiment.

FIG. 16 is an example of a table indicating association of the configuration parameters in the grant free access according to the third embodiment.

FIG. 17 is an example of a table indicating association of the configuration parameters in the grant free access according to a fourth embodiment.

FIG. 18 is an example of a table indicating association of the configuration parameters in the grant free access according to a fifth embodiment.

DESCRIPTION OF EMBODIMENTS

Figure 1:
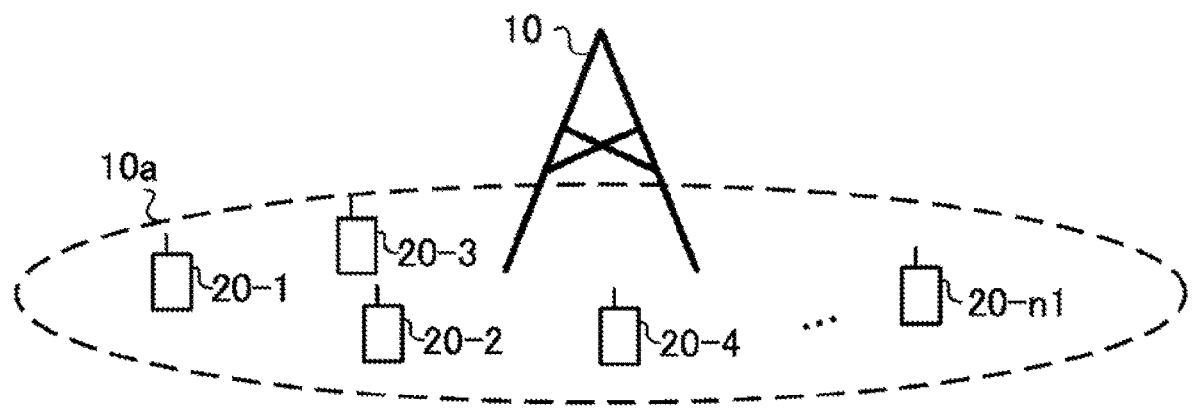
FIG. 1 is a diagram illustrating an example of a communication system according to a first embodiment.

A communication system according to the present embodiment includes a base station apparatus (cell, small cell, serving cell, component carrier, eNodeB, Home eNodeB) and a terminal apparatus (terminal, mobile terminal, User Equipment (UE)). In the communication system, for a downlink, the base station apparatus serves as a transmission device (transmission point, transmit antenna group, transmit antenna port group), and the terminal apparatus serves as a reception device (reception point, receiving terminal, receive antenna group, receive antenna port group). For an uplink, the base station apparatus serves as a reception device, and the terminal apparatus serves as a transmission device. The communication system is applicable to Device-to-Device (D2D) communication. In that case, both the transmission device and the reception device serve as terminal apparatuses.

The communication system is not limited to data communication between the terminal apparatus and the base station apparatus in which human beings intervene, and is also applicable to modes of data communication needing no intervention of human beings, such as Machine Type Communication (MTC), Machine-to-Machine (M2M) Communication, Internet of Things (IoT) communication, and Narrow Band-IoT (NB-IoT) (which are hereinafter referred to as MTC). In this case, the terminal apparatus serves as an MTC terminal. The communication system can use, in the uplink and downlink, a transmission scheme such as Discrete Fourier Transform Spread-Orthogonal Frequency Division Multiplexing (DFTS-OFDM, also referred as SC-FDMA) or OFDM. The communication system can also use Filter Bank Multi Carrier (FBMC), Filtered-OFDM (f-OFDM), Universal Filtered-OFDM (UF-OFDM), or Windowing-OFDM (W-OFDM), to which a filter is applied, or a transmission scheme using sparse codes (Sparse Code Multiple Access (SCMA)). The communication system may further apply DFT precoding and use a signal waveform using the filter. The communication system can further apply code spreading, interleaving, sparse coding, or the like in the transmission scheme. Note that, in the description below, Discrete Fourier Transform Spread-Orthogonal Frequency Division Multiplexing (DFTS-OFDM, also referred as SC-FDMA) transmission is used for the uplink and OFDM transmission is used for the downlink but that the present invention is not limited to this and other transmission schemes can be applied.

The base station apparatus and the terminal apparatus according to the present embodiment can communicate in frequency bands including what is called licensed bands the use of which is allowed (licensed) by a country or region where a radio operator provides services and/or what is called unlicensed bands needing no use allowance (license) of the country or region.

According to the present embodiment, "X/Y" includes the meaning of "X or Y". According to the present embodiment, "X/Y" includes the meaning of "X and Y". According to the present embodiment, "X/Y" includes the meaning of "X and/or Y".

First Embodiment

FIG. 1 is a diagram illustrating an example of a configuration of a communication system according to the present embodiment. A communication system according to the present embodiment includes a base station apparatus 10 and terminal apparatuses 20-1 to 20-n1 (n1 is the number of terminal apparatuses connected to the base station apparatus 10). The terminal apparatuses 20-1 to 20-n1 are also collectively referred to as the terminal apparatus 20. Coverage 10a is a range (a communication area) in which the base station apparatus 10 can connect to the terminal apparatuses 20 (the coverage 10a is also referred to as a cell).

In FIG. 1, the base station apparatus 10 and the terminal apparatus 20 support, for the uplink, multiple accesses using grant free (also referred to as grant-less, contention base) (grant free access). In the grant free access, the terminal apparatus 20 transmits uplink data (uplink physical channel and the like) regardless of reception of UL Grant (also referred to as uplink grant, scheduling grant) (without reception of UL Grant) from the base station apparatus 10. The base station apparatus 10 and the terminal apparatus 20 support non-orthogonal multiple accesses. Note that the base station apparatus 10 and the terminal apparatus 20 can also support both grant free access and scheduled access. The base station apparatus 10 and the terminal apparatus 20 can also support both non-orthogonal multiple accesses and orthogonal multiple accesses. Note that the UL Grant refers to an instruction given by the base station apparatus 10 to the terminal apparatus 20 to perform resource block assignment on a physical uplink shared channel (for example, a resource block assignment field for the physical uplink shared channel included in a DCI format in LTE) by using Downlink Control Information (DCI) used for scheduling of the physical uplink shared channel.

Downlink control information for uplink physical channel transmission can include a shared field shared by the scheduled access and the grant free access. In this case, in a case that the base station apparatus 10 instructs transmission of the uplink physical channel using the grant free access, the base station apparatus 10 and the terminal apparatus 20 interpret a bit sequence stored in the shared field according to a configuration for the grant free access (for example, a look-up table defined for the grant free access). Similarly, in a case that the base station apparatus 10 instructs transmission of the uplink physical channel using the scheduled access, the base station apparatus 10 and the terminal apparatus 20 interpret the shared field according to a configuration for the scheduled access. Transmission of the uplink physical channel in the grant free access is referred to as an Asynchronous data transmission. Note that transmission of the uplink physical channel in the scheduled one is referred to as a Synchronous data transmission.

In the grant free access, the terminal apparatus 20 may randomly select a radio resource for transmission of uplink data. For example, the terminal apparatus 20 has been notified of multiple available radio resource candidates as a resource pool from the base station apparatus 10 and randomly selects a radio resource from the resource pool. In the grant free access, the base station apparatus 10 may be configured in advance a radio resource to be used by the terminal apparatus 20 to transmit uplink data. In this case, the terminal apparatus 20 uses the pre-configured radio resource to transmit the uplink data without receiving the UL Grant. The radio resource includes multiple uplink multi-access resources (resources to which the uplink data can be mapped). The terminal apparatus 20 uses one or more uplink multi-access resources selected from the multiple uplink multi-access resources to transmit the uplink data. Note that the radio resource to be used by the terminal apparatus 20 to transmit the uplink data may be predetermined in the communication system constituted by the base station apparatus 10 and the terminal apparatus 20. The radio resource to be used to transmit the uplink data may be notified to the terminal apparatus 20 by the base station apparatus 10 by using a broadcast channel/Radio Resource Control (RRC)/system information (for example, System Information Block (SIB))/downlink control channel (downlink control information).

In the grant free access, the uplink multi-access resource is constituted by a multi-access physical resource and a Multi Access Signature Resource. The multi-access physical resource is constituted by a resource consisting of a time domain and a frequency domain. The multi-access physical resource and the multi-access signature resource may be used to specify an uplink physical channel transmitted by each terminal apparatus. The resource block is a unit to which the base station apparatus 10 and the terminal apparatus 20 can map a physical channel (for example, a physical data shared channel, a physical control channel). The resource block is constituted by multiple subcarriers (for example, 12 subcarriers, 16 subcarriers) in the frequency domain.

Figure 2:
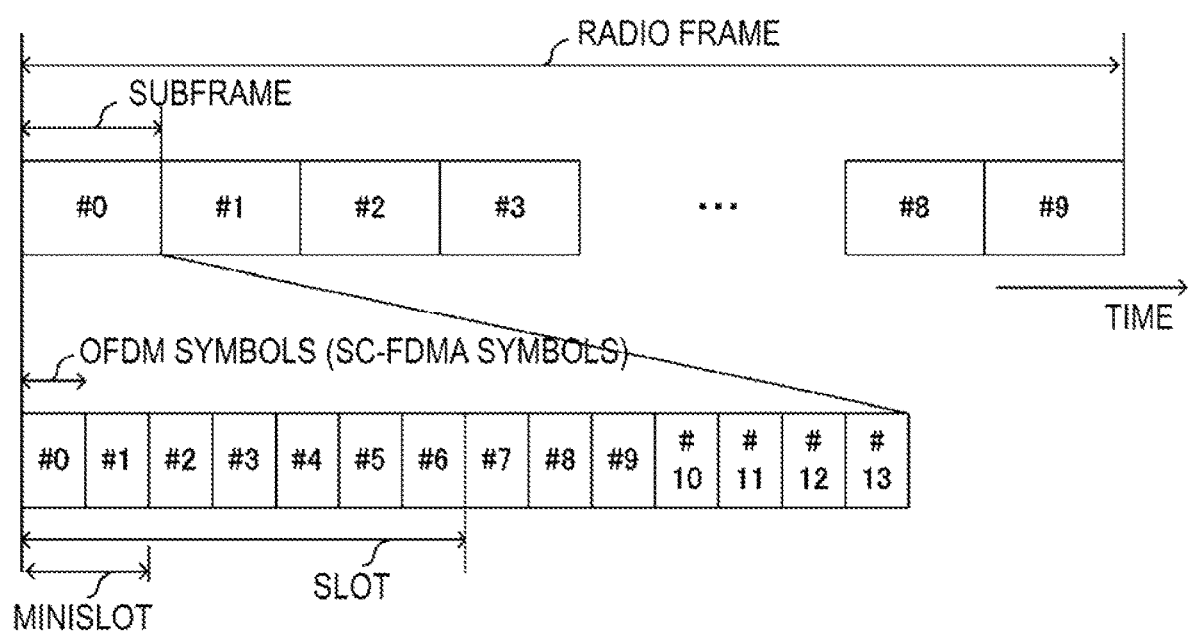
FIG. 2 is a diagram illustrating an example of a radio frame configuration of the communication system according to the first embodiment.

FIG. 2 is a diagram illustrating an example of a radio frame configuration of the communication system according to the present embodiment. The radio frame configuration represents a configuration of multi-access physical resources in the time domain. A single radio frame is constituted by multiple subframes. FIG. 2 is an example in which a single radio frames is constituted by 10 subframes. The terminal apparatus 20 includes subcarrier spacings (reference numerology) used as references. The subframe is constituted by multiple OFDM symbols generated at the subcarrier spacings used as references. FIG. 2 is an example in which a single subframe is constituted by 14 OFDM symbols.

A single slot is constituted by multiple OFDM symbols generated at subcarrier spacings used by the terminal apparatus 20 for uplink data transmission. FIG. 2 is an example in which a single slot is constituted by 14 OFDM symbols. FIG. 2 illustrates a case where the subcarrier spacings used as references are identical to the subcarrier spacings used for uplink data transmission. In this case, a single subframe is constituted by multiple slots. FIG. 2 is an example in which a single subframe is constituted by two slots. The communication system according to the present embodiment may assume a slot to be a minimum unit to which the terminal apparatus 20 maps a physical channel (for example, a physical data shared channel, a physical control channel). In this case, in the multi-access physical resource, a single slot corresponds to a resource block unit in the time domain.

A single minislot is constituted by multiple OFDM symbols (for example, two, four OFDM symbols) generated at subcarrier spacings to be used for an uplink data transmission by the terminal apparatus 20. A minislot length is smaller than a slot length. FIG. 2 is an example in which a single minislot is constituted by two OFDM symbols. The base station apparatus 10 may configure the number of OFDM symbols constituting a slot/minislot. The base station apparatus 10 may signal the number of OFDM symbols constituting a slot/minislot to notify the terminal apparatus 20 of the number. The communication system according to the present embodiment may assume a minislot to be the minimum unit to which the terminal apparatus 20 maps a physical channel (for example, a physical data shared channel, a physical control channel). In this case, in the multi-access physical resource, a single minislot corresponds to a resource block unit in the time domain.

The multi-access signature resource is constituted by at least one multi-access signature included in a group of multiple multi-access signatures (also referred to as a multi-access signature pool). The multi-access signature is information indicating a feature (mark, index) distinguishing among (identifying) the uplink physical channels transmitted by the terminal apparatuses. The multi-access signature includes a spatial multiplexing pattern, a spreading code pattern (Walsh code, Orthogonal Cover Code (OCC), a cyclic shift for data spreading, sparse code, or the like), an interleave pattern, a demodulation reference signal pattern (reference signal sequence, cyclic shift), and transmit power. In the grant free access, the terminal apparatus uses one or more multi-access signatures selected from the multi-access pool to transmit the uplink data. The terminal apparatus 20 can notify the base station apparatus 10 of available multi-access signatures. The base station apparatus 10 can notify the terminal apparatus of a multi-access signature to be used by the terminal apparatus 20 for transmitting the uplink data. The base station apparatus 10 can notify the terminal apparatus of a multi-access signature group available for the terminal apparatus 20 to transmit the uplink data. The available multi-access signature group may be notified using a broadcast channel/RRC/system information/downlink control channel. In this case, the terminal apparatus 20 can transmit the uplink data by using a multi-access signature selected from the notified multi-access signature group.

The terminal apparatus 20 uses a multi-access resource to transmit the uplink data. For example, the terminal apparatus 20 can map the uplink data to a multi-access resource constituted by one multi-access physical resource and a multi-access signature resource consisting of a spreading code pattern. The terminal apparatus 20 can also allocate the uplink data to a multi-access resource constituted by one multi-access physical resource and a multi-access signature resource consisting of an interleave pattern. The terminal apparatus 20 can also map the uplink data to a multi-access resource constituted by one multi-access physical resource and a multi-access signature resource consisting of a demodulation reference signal pattern. The terminal apparatus 20 can also map the uplink data to a multi-access resource constituted by one multi-access physical resource and a multi-access signature resource consisting of a transmit power pattern (for example, transmit power for each of the uplink data may be configured to cause a difference in receive power at the base station apparatus 10). In such grant free access, the communication system according to the present embodiment allows uplink data transmitted by multiple terminal apparatuses 20 to overlap one another (collide against one another) in the uplink multi-access resource.

In the grant free access, the base station apparatus 10 detects a signal for the uplink data transmitted by each terminal apparatus. To detect the uplink data signal, the base station apparatus 10 may include Symbol Level Interference Cancellation (SLIC) configured to cancel interference based on a demodulation result of an interference signal, Codeword Level Interference Cancellation (CWIC, also referred to as Sequential Interference Canceller (SIC) or Parallel Interference Canceller (PIC)) configured to cancel the interference based on a decoding result of the interference signal, turbo equalization, maximum likelihood (ML) or Reduced complexity maximum likelihood (R-ML) configured to search for the most likely signal to be transmitted among transmission signal candidates, Enhanced Minimum Mean Square Error-Interference Rejection Combining (EMMSE-IRC) configured to prevent the interference signal by linear computation, or signal detection based on message passing.

Note that, in the description below, the base station apparatus applies an Advanced Receiver with turbo equalization or the like to the grant free multi-access to detect a non-orthogonally multiplexed uplink data signal but that the present invention is not limited to this so long as the uplink data signal can be detected. For example, a matched filter with Maximal Ratio Combining (MRC) or the like may be used.

In FIG. 1, the following uplink physical channels are used in the uplink radio communication using the scheduled access/grant free access. The uplink physical channels are used for transmitting information output from a higher layer.

Physical uplink control channel
Physical uplink shared channel
Physical random access channel The physical uplink control channel is a physical channel that is used to transmit Uplink Control Information (UCI).

The uplink control information includes a positive acknowledgement (ACK)/negative acknowledgement (NACK) for downlink data (a downlink transport block or a Downlink-Shared Channel (DL-SCH)). The ACK/NACK is also referred to as a signal indicating delivery confirmation, HARQ-ACK, HARQ feedback. Note that, to support the scheduled access, the uplink control information can include a Scheduling Request (SR).

The uplink control information includes Channel State Information (CSI) for the downlink. The channel state information includes a Rank Indicator (RI) indicating the suited number of spatial multiplexing (the number of layers), a Precoding Matrix Indicator (PMI) indicating a suited precoder, and a Channel Quality Indicator (CQI) specifying a suited transmission rate. The PMI indicates a codebook determined by the terminal apparatus. The codebook is associated with precoding of the physical downlink shared channel. The CQI can be a suited modulation scheme in a prescribed band (for example, Binary Phase Shift Keying (BPSK), quadrature Phase Shift Keying (QPSK), quadrature amplitude modulation (16QAM), 64QAM, 256QAM, or the like), and/or a coding rate. Note that, in a case of the grant free access, the uplink control information may be omitted.

The physical uplink shared channel is a physical channel used for transmission of the uplink data (uplink transport block, UL-SCH). The physical uplink shared channel may be used for transmission of ACK/NACK for downlink data and/or channel state information. The physical uplink shared channel may be used to transmit the uplink control information. The physical uplink shared channel may be generated by adding a Cyclic Redundancy Check (CRC) to the uplink data. The CRC may be scrambled with a sequence representing an identifier of the terminal apparatus (also referred to as a User Equipment Identifier (UE ID)) (the scrambling is also referred to as an EXCLUSIVE OR operation, masking, encryption). As the UE ID, a Cell-Radio Network Temporary Identifier (C-RNTI), a Temporary C-RNTI (T C-RNTI), or the like can be used. The UE ID may be allocated to the terminal apparatus by the base station apparatus in a case that the terminal apparatus accesses a new cell by using a cell update procedure. The base station apparatus may notify the terminal apparatus of each UE ID. The UE ID can be included in message 2 (random access response (RAR)/message 4 (Contention Resolution) in a random access procedure. The UE ID can also be included in a Radio Resource Control (RRC) message.

In the grant free access, the UE ID is associated with parameters used to identify the uplink physical channel (for example, parameters regarding configurations of a reference signal/spreading code/interleave pattern/transmit power control). In the grant free access, the UE ID is associated with parameters regarding the multi-access signature resource. For the UE ID, an identifier for the grant free access may be defined that is distinguished from an identifier for the scheduling access.

The physical uplink shared channel is used to transmit the RRC message. The RRC message is information/signal that is processed in a radio resource control layer. The RRC message can include a UE Capability of the terminal apparatus. The UE Capability is information indicating functions supported by the terminal apparatus. The physical uplink shared channel is used to transmit an MAC Control Element (MAC CE). The MAC CE is a signal/information that is processed (transmitted) in a Medium Access Control (MAC) layer. For example, a power headroom may be included in the MAC CE and may be reported via the physical uplink shared channel. In other words, a MAC CE field may be used to indicate a level of the power headroom. The uplink data can include the RRC message and the MAC CE.

The physical random access channel is used to transmit a preamble used for random access. The grant free access allows the physical random access channel to be omitted.

In the uplink radio communication, an Uplink Reference Signal (UL RS) is used as an uplink physical signal. The uplink physical signal is not used for transmission of information output from higher layers, but is used by the physical layer. The uplink reference signal includes a Demodulation Reference Signal (DMRS) and a Sounding Reference Signal (SRS).

The demodulation reference signal is associated with transmission of the physical uplink shared channel or the physical uplink control channel. For example, the base station apparatus 10 uses the demodulation reference signal for channel compensation in a case of demodulating the physical uplink shared channel or the physical uplink control channel. A demodulation reference signal sequence may be generated in association with a cell ID of the base station apparatus 10. The demodulation reference signal sequence may be generated by applying the cyclic shift and the Orthogonal Cover Code (OCC). For example, the demodulation reference signal sequence r is expressed by Equations (1) to (6).

Expression (1)

$$r(m \cdot M_{sc}^{RS} + n) = w(m) r_{u,v}^{(\alpha)}(n) \quad (1)$$

$$r_{u,v}^{(\alpha)}(n) = e^{j\alpha n} \bar{r}_{u,v}(n), 0 \le n < M_{sc}^{RS} \quad (2)$$

$$\alpha = 2\pi n_{cs} / 12 \quad (3)$$

$$n_{cs} = n_{DMRS} \bmod 12 \quad (4)$$

$$\bar{r}_{u,v}(n) = x(n \bmod N_{ZC}^{RS}), 0 \le n < M_{sc}^{RS} \quad (5)$$

$$x(m) = e^{-j\frac{\pi m(m+1)}{N_{ZC}^{RS}}}, 0 \le m \le N_{ZC}^{RS} - 1 \quad (6)$$

m depends on the number of OFDM symbols to which the demodulation reference signal is mapped (for example, in a case that the demodulation reference signal is mapped to two OFDM symbols per one resource block, m=0, 1). M_SC^RS is the number of subcarriers to which the demodulation reference signal is mapped. α is a cyclic shift amount. α is a maximum prime number that satisfies N_ZC^RS<M_SC^RS. n_DMRS is a parameter for the cyclic shift amount configured by the base station apparatus 10. n_DMRS is associated with a cyclic shift index. The base station apparatus 10 can notify, by using the downlink control channel/RRC, the terminal apparatus 20 of the cyclic shift index associated with n_DMRS. n_DMRS may be constituted by a configuration parameter notified using the downlink control channel and a configuration parameter notified using the RRC. r(n)_u, v is a basic sequence for generation of a demodulation reference signal. For example, as the basis sequence, a Zadoff-Chu sequence is used. r(n)_u, v can be a Zadoff-Chu sequence including the cell ID as a seed. The basic sequence r(n)_u, v is cyclic-shifted based on the parameter α. In Equation (1), 12 cyclic-shifted basic sequences r(n)_u, v^(α) may be generated from one basic sequence.

The cyclic-shifted basic sequences r(n)_u, v^(α) are multiplied by an OCC sequence w. The demodulation reference signal may be mapped to one or more OFDM symbols. The multiplication by the OCC sequence w is performed for each OFDM symbol (with respect to the time domain). For example, in a case that the demodulation reference signal is mapped across two OFDM symbols, the OCC sequence w(m) has two patterns (m=0, 1) [1 1], [1 −1]. In a case that w=[1 −1] (in other words, w(0)=1, w(1)=−1) is selected, a sequence mapped to M_SC^RS subcarriers in a first OFDM symbol is multiplied by 1, and a sequence mapped to M_SC^RS subcarriers in a second OFDM symbol is multiplied by −1. The pattern of the OCC sequence w(m) is associated with the OCC index. The base station apparatus 10 can notify the terminal apparatus 20 of the OCC index by using the downlink control channel/RRC. For example, in a case that an OCC with a sequence length of 2 is used in Equation (1), up to 24 demodulation reference signal sequences may be generated from one basic sequence. Note that the w may be notified in association with the cyclic shift index. Note that the demodulation reference signal sequence r may be generated for each layer.

The demodulation reference signal sequence may be multiplied by a spreading code sequence with respect to the frequency domain. For example, a sequence mapped to M_SC^RS subcarriers in each OFDM symbol is multiplied by the spreading code sequence. The spreading code sequence is identical to a spreading code sequence by which the physical uplink shared channel is multiplied. The Sounding Reference Signal is not associated with transmission of the physical uplink shared channel or the physical uplink control channel. For example, the base station apparatus 10 uses the Sounding Reference Signal to measure an uplink channel state (CSI Measurement).

In FIG. 1, in the downlink radio communication using the scheduled access/grant free access, the following downlink physical channels are used. The downlink physical channels are used for transmitting information output from the higher layer.

Physical broadcast channel
Physical downlink control channel
Physical downlink shared channel The physical broadcast channel is used for broadcasting a Master Information Block (MIB, a Broadcast Channel (BCH)) that is shared by the terminal apparatuses. The MIB is system information. The physical broadcast channel includes system control information to be broadcasted. For example, the physical broadcast channel includes information such as a downlink system band, a System Frame Number (SFN), and the number of transmit antennas used by eNB. The physical broadcast channel may include configuration information about a channel including a retransmission request instruction (including a hybrid automatic retransmission request instruction). The physical broadcast channel may include information indicating whether or not the base station apparatus supports the grant free access. The physical broadcast channel may include a part or all of the configuration information about the grant free access.

The physical downlink control channel is used to transmit Downlink Control Information (DCI). For the Downlink Control Information, multiple formats based on an intended use (also referred to as DCI formats) are defined. Each of the formats is used according to the intended use. The downlink control information includes control information for downlink data transmission and control information for uplink data transmission. The downlink control information can include information about retransmission of the uplink data (physical uplink shared channel).

The DCI format for downlink data transmission is used for scheduling of the physical downlink shared channel. The DCI format for downlink data transmission is also referred to as downlink grant (or downlink assignment). The DCI format for downlink data transmission includes downlink control information such as information about resource allocation for the physical downlink shared channel and/or information about a Modulation and Coding Scheme (MCS) for the physical downlink shared channel. The DCI format for downlink data transmission may include Transmission Power Control (TPC) for the physical uplink channel (for example, the physical uplink control channel, the physical uplink shared channel). The DCI format for downlink data transmission may include a part or all of the configuration information about the grant free access.

The DCI format for uplink data transmission is used to notify the terminal apparatus of control information about transmission of the physical uplink shared channel. The DCI format for uplink data transmission can include the uplink control information such as information about the MCS for the physical uplink shared channel, information about retransmission of the uplink data (physical uplink shared channel), information about the cyclic shift for the demodulation reference signal, transmit power control for the physical uplink channel, and a request (CSI request) for downlink Channel State Information (CSI, also referred to as reception quality information). The DCI format for uplink data transmission can include multi-access resources available to the terminal apparatus 20/available multi-access signature resources (available multi-access signature group, available multi-access signatures). The DCI format for uplink data transmission may include a part or all of the configuration information about the grant free access. A DCI format may be defined that is unique to the grant free access and that is used to notify the configuration information about the grant free access. Note that one or more pieces of information included in the DCI format for uplink data transmission can be included in the DCI format for downlink data transmission.

The physical uplink control channel may be generated by adding the Cyclic Redundancy Check (CRC) to the downlink control information. In the physical downlink control channel, the CRC is scrambled with the terminal device identifier (UE ID). For example, the CRC is scrambled with the Cell-Radio Network Temporary Identifier (C-RNTI).

The physical downlink shared channel is used for transmission of the downlink data (downlink transport block, DL-SCH). The physical downlink shared channel is used to transmit a system information message (System Information Block (SIB)). The system information message may include a system information block unique to the grant free access.

For example, the system information block unique to the grant free access can include configuration information about multi-access physical resources (frequency bands and the like)/multi-access signature group/multi-access signatures with which to perform the grant free access. The system information block unique to the grant free access can include parameters used to identify the uplink data (for example, parameters regarding configurations of the reference signal/spreading code/interleave pattern/transmit power control, or the like). Note that a part or all of the system information message can be included in the RRC message.

The physical downlink shared channel is used to transmit the RRC message. The RRC message transmitted from the base station apparatus may be common to multiple terminal apparatuses in a cell (unique to the cell). The information common to the terminal apparatuses in the cell may be transmitted using the RRC message unique to the cell. The RRC message transmitted from the base station apparatus may be a message dedicated to a given terminal apparatus (also referred to as dedicated signaling). Terminal apparatus-specific information (unique to the user) may be transmitted using the message dedicated to the given terminal apparatus.

The RRC message can include a message for the configuration information about the grant free access (also referred to as grant free access configuration assist information). For example, the RRC message can include the configuration information about the multi-access physical resources (frequency bands and the like)/multi-access signature group/multi-access signatures with which the grant free access is performed. The RRC message can include the parameters used to identify the uplink data (for example, the parameters regarding the configurations of the reference signal/spreading code/interleave pattern/transmit power control, or the like). The RRC message may be a message dedicated to the grant free access. The information unique to the grant free access may be transmitted using the message dedicated to the grant free access.

The physical downlink shared channel is used for transmission of the MAC CE. The RRC message and/or the MAC CE is also referred to as higher layer signaling.

The physical downlink control channel may be generated by addition of the Cyclic Redundancy Check (CRC). The CRC is scrambled with the terminal device identifier (UE ID). In the downlink control channel (physical downlink shared channel, physical downlink control channel), the identifier used to scramble the CRC may be defined as an identifier for the grant free access distinguished from the identifier for the scheduling access. For example, in a case that the downlink physical channel is transmitted using the scheduling access and the uplink physical channel is transmitted using the grant free access, different identifiers may be used for the uplink and for the downlink.

In the downlink radio communication in FIG. 1, a Synchronization signal (SS) and a Downlink Reference Signal (DL RS) are used as downlink physical signals. The downlink physical signals are not used for transmission of information output from the higher layers, but are used by the physical layer.

The synchronization signal is used by the terminal apparatus to take synchronization in the frequency domain and the time domain in the downlink. The downlink reference signal is used by the terminal apparatus to perform channel compensation on the downlink physical channel. For example, the downlink reference signal is used to demodulate the physical broadcast channel, the physical downlink shared channel, the physical downlink control channel. The downlink reference signal can be used by the terminal apparatus to calculate the downlink Channel State Information (measurement). Furthermore, the reference signal used to demodulate various channels may be different from the reference signal used for the measurement (for example, Demodulation Reference Signal (DMRS), Cell-specific Reference Signal (CRS) in LTE)

The downlink physical channels and the downlink physical signals are collectively referred to as downlink signals. The uplink physical channels and the uplink physical signals are also collectively referred to as uplink signals. The downlink physical channels and the uplink physical channels are collectively referred to as physical channels. The downlink physical signals and the uplink physical signals are also collectively referred to as physical signals.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The Transport Block is a unit of data that the MAC layer delivers to the physical layer. In the physical layer, the Transport Block is mapped to a codeword, and coding processing is performed for each codeword.

Figure 3:
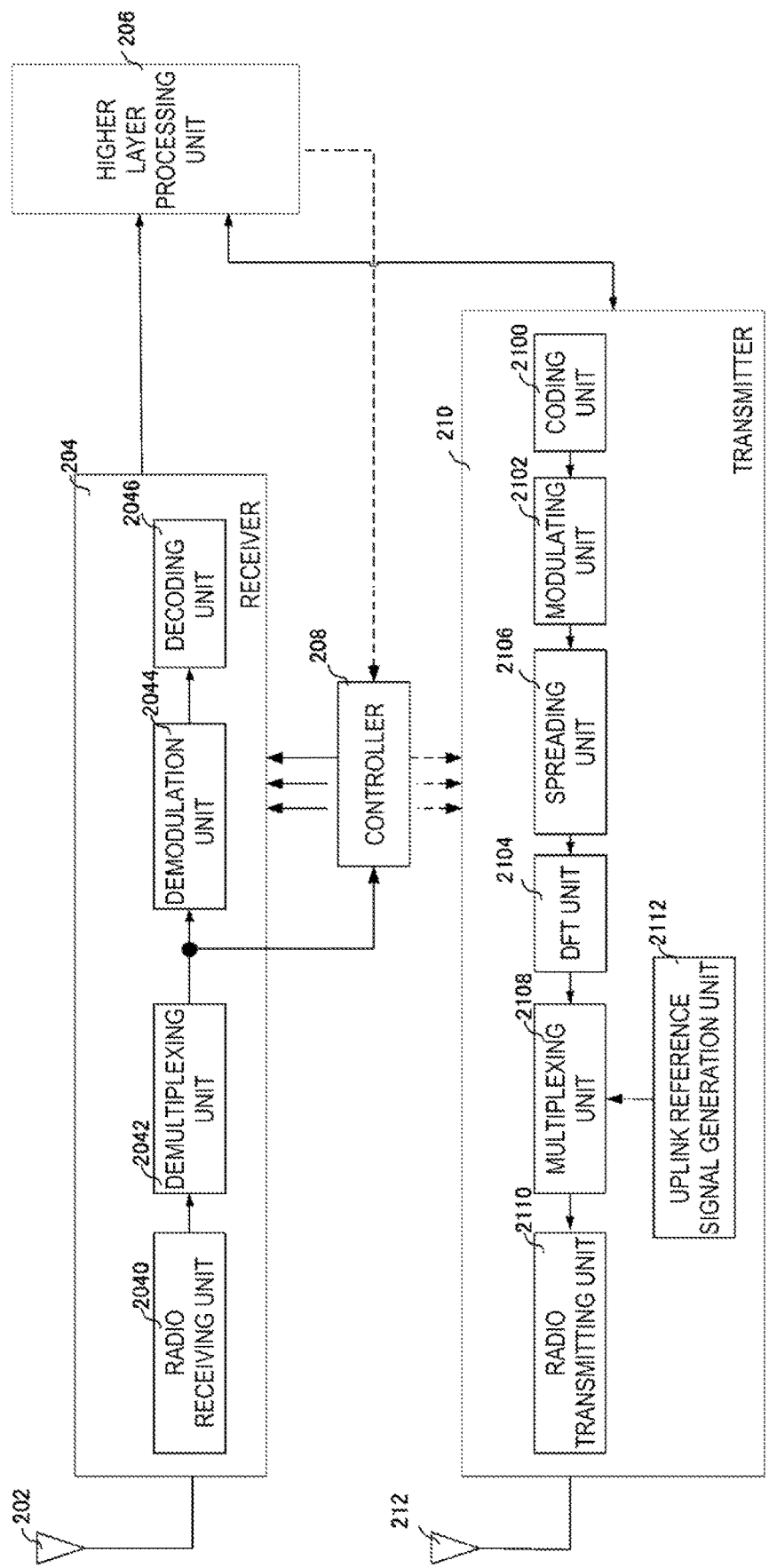
FIG. 3 is a schematic block diagram illustrating a configuration of a terminal apparatus 20 according to the first embodiment.

FIG. 3 is a schematic block diagram illustrating a configuration of the terminal apparatus 20 according to the present embodiment. The terminal apparatus 20 is configured to include a receive antenna 202, a receiver (receiving step) 204, a higher layer processing unit (higher layer processing step) 206, a controller (control step) 208, a transmitter (transmitting step) 210, and a transmit antenna 212. The receiver 204 is configured to include a radio receiving unit (radio receiving step) 2040, a demultiplexing unit (demultiplexing step) 2042, a demodulation unit (demodulating step) 2044, and a decoding unit (decoding step) 2046. The transmitter 210 is configured to include a coding unit (coding step) 2100, a modulating unit (modulating step) 2102, a DFT unit (DFT step) 2104, a spreading unit (spreading step) 2106, a multiplexing unit (multiplexing step) 2108, a radio transmitting unit (radio transmitting step) 2110, and an uplink reference signal generation unit (uplink reference signal generating step) 2112.

The receiver 204 demultiplexes, demodulates, and decodes a downlink signal (downlink physical channel, downlink physical signal) received from the terminal apparatus 10 via the receive antenna 202. The receiver 204 outputs, to the controller 208, a control channel (control information) separated from the received signal. The receiver 204 outputs a decoding result to the higher layer processing unit 206. The receiver 204 acquires information (referred to as configuration information about uplink transmission) about the configurations of the uplink physical channel and the uplink reference signal included in the received signal. The configuration information about uplink transmission includes the configuration information about the grant free access (this will be described below in detail). The downlink signal can include the UE ID of the terminal apparatus 20.

The radio receiving unit 2040 converts, by down-converting, a downlink signal received through the receive antenna 202 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 2040 removes portions corresponding to Cyclic Prefixes (CPs) from the digital signal resulting from the conversion, performs fast Fourier transform on the downlink signal from which the CPs have been removed (demodulating processing on OFDM modulation), and extracts a frequency domain signal.

The demultiplexing unit 2042 separates and extracts the downlink physical channel (physical downlink control channel, physical downlink shared channel, physical broadcast channel, or the like), the downlink reference signal, and the like that are included in the extracted frequency domain downlink signal. The demultiplexing unit 2042 includes a channel measuring function (channel measurement unit) using the downlink reference signal. The demultiplexing unit 2042 includes a channel compensating function (channel compensation unit) for the downlink signal using the channel measurement result. The demultiplexing unit outputs the down physical downlink channel to the demodulating unit 2044/controller 208.

The demodulation unit 2044 demodulates the received signal by using a predetermined modulation scheme such as BPSK, QPSK, 16QAM, 64QAM, 256QAM, or the like or a modulation scheme notified in advance with the downlink grant for each of the modulation symbols of each downlink physical channel The decoding unit 2046 decodes coded bits of each demodulated downlink physical channel in compliance with a predetermined coding scheme at a coding rate determined in advance or notified in advance with the uplink grant, and outputs the decoded downlink data/configuration information about downlink reception/configuration information about uplink transmission to the higher layer processing unit 206.

The controller 208 controls the receiver 204 and the transmitter 210 by using the configuration information about downlink reception/configuration information about uplink transmission, included in the downlink physical channel (physical downlink control channel, physical downlink shared channel, or the like). The configuration information about uplink transmission can include the configuration information about the grant free access. The controller 208 controls the uplink reference signal generation unit 2112 and the spreading unit 2106 in accordance with the configuration information about multi-access resources (multi-access physical resource/multi-access signature resource) included in the configuration information about the grant free access. In FIG. 3, the controller 208 controls the uplink reference signal generation unit 2112 and the spreading unit 2106 in accordance with a spreading code sequence and parameters used for generation of a demodulation reference signal calculated from the configuration information about the grant free access. The controller 208 acquires the configuration information about downlink reception/configuration information about uplink transmission from the receiver 204/higher layer processing unit 206. The configuration information about downlink reception/configuration information about uplink transmission may be acquired from downlink control information (DCI) included in the downlink physical channel. The configuration information about downlink reception/configuration information about uplink transmission may be acquired from downlink control information (DCI) included in the downlink physical channel. The configuration information about the grant free access may be included in the physical downlink control channel/physical downlink shared channel/broadcast channel. The downlink physical channel may include a physical channel dedicated to the grant free access. In this case, a part or all of the configuration information about the grant free access may be acquired from the physical channel dedicated to the grant free access. Note that, in a case that the transmitter 210 transmits the physical uplink control channel, the controller 208 generates Uplink Control information (UCI) and outputs the UCI to the transmitter 210. Note that some of the functions of the controller 108 can be included in the higher layer processing unit 102.

The higher layer processing unit 206 processes a Medium Access Control (MAC) layer, a Packet Data Convergence Protocol (PDCP) layer, a Radio Link Control (RLC) layer, a Radio Resource Control (RRC) layer. The higher layer processing unit 206 outputs, to the transmitter 210, information about the UE capability supported by the terminal apparatus itself. For example, the higher layer processing unit 206 signals the information about the UE capability in the RRC layer.

The information about the UE capability includes information indicating whether the stated terminal apparatus supports a prescribed function, or information indicating that the stated terminal apparatus has completed the introduction and test of a prescribed function. The information of whether the prescribed function is supported includes information of whether the introduction and test of the prescribed function have been completed. In a case that the terminal apparatus supports the prescribed function, the terminal apparatus transmits information (parameters) indicating whether the prescribed function is supported. In a case that the terminal apparatus does not support the prescribed function, the terminal apparatus does not transmit the information (parameters) indicating whether the prescribed function is supported. In other words, whether the prescribed function is supported is notified by whether the information (parameters) indicating whether the prescribed function is supported is transmitted. The information (parameters) indicating whether a prescribed function is supported may be notified using one bit of 1 or 0.

The information about the UE capability includes information indicating support of the grant free access. In a case that multiple functions corresponding to the grant free access exist, the higher layer processing unit 206 can transmit information indicating whether or not the function is supported for each function. The information indicating support of the grant free access includes information indicating the multi-access physical resource and/or the multi-access signature resource supported by the terminal apparatus. The information indicating support of the grant free access may include a configuration of a look-up table for the configurations of the multi-access physical resource and/or the multi-access signature resource. The information indicating support of the grant free access may include some or all of capability corresponding to multiple tables indicating antenna ports, scrambling identities, and the number of layers, capability corresponding to a prescribed number of antenna ports, and capability corresponding to a prescribed transmission mode. The transmission mode is determined based on the number of antenna ports, the transmission diversity, the number of layers, support of the grant free access, and the like.

The higher layer processing unit 206 manages various configuration information about the terminal apparatus itself. Some of the above-described various types of configuration information are input to the controller 208. The various types of configuration information are received from the base station apparatus 10 via the receiver 204 using the downlink physical channel. The various types of configuration information include the configuration information about the grant free access input from the receiver 204. The configuration information about the grant free access includes the configuration information about multi-access resources (multi-access physical resource, multi-access signature resource). For example, the configuration information may include configurations regarding the multi-access signature resource (configurations regarding processing based on a mark for identifying the uplink physical channel transmitted by the terminal apparatus) such as an uplink resource block configuration (the number of OFDM symbols/subcarriers per resource block), a demodulation reference signal configuration (reference signal sequence, cyclic shift, OFDM symbols to be mapped, and the like), a spreading code configuration (Walsh code, Orthogonal Cover Code (OCC), sparse code, and the like), an interleave configuration, a transmit power configuration, a transmit and/or receive antenna configuration, a transmit and/or receive beamforming configuration. These multi-access signature resources are directly or indirectly associated (linked) with one another. The association of the multi-access signature resources is indicated by a multi-access signature process index (this will be described below in detail). Furthermore, the configuration information about the grant free access may include the configuration of the look-up table for the configurations of the multi-access physical resource and/or the multi-access signature resource. The configuration information about the grant free access may include information indicating setup, release of the grant free access, ACK/NACK reception timing information for the uplink data signal, and retransmission timing information for the uplink data signal.

The higher layer processing unit 206 manages the multi-access resources (multi-access physical resource, multi-access signature resource) for grant-free transmission of the uplink data (transport block), based on the configuration information about the grant free access. The higher layer processing unit 206 outputs information for controlling the transmitter 210, to the controller 208, based on the configuration information about the grant free access. The higher layer processing unit 206 acquires the UE ID of the terminal apparatus itself from the receiver 204/controller 208. The UE ID can be included in the configuration information about the grant free access.

The higher layer processing unit 206 outputs the uplink data (for example, the DL-SCH) generated by a user operation or the like, to the transmitter 210. The higher layer processing unit 206 can also output, to the transmitter 210, uplink data generated without intervention of the user operation (for example, data acquired by a sensor). The uplink data may include a field in which the UE ID is stored. The higher layer processing unit 206 adds the CRC to the uplink data. Parity bits of the CRC are generated using the uplink data. The parity bits of the CRC are scrambled with the UE ID allocated to the terminal apparatus itself (the scrambling is also referred to as an EXCLUSIVE OR operation, masking, encryption). For the UE ID, an identifier unique to the terminal apparatus in the grant free access may be used.

In a case that uplink data to be transmitted is generated, the transmitter 210 transmits the physical uplink shared channel without receiving the UL Grant, based on the configuration information about the grant free access transmitted from the base station apparatus 10. The transmitter 210 generates a physical uplink shared channel and a demodulation reference signal associated with the physical uplink shared channel, in accordance with the configurations regarding grant free access input from the controller 208.

The coding unit 2100 uses the coding scheme predetermined in advance/coding scheme configured by the controller 208 to code the uplink data input from the higher layer processing unit 206 (including repetition). For the coding scheme, convolutional coding, turbo coding, Low Density Parity Check (LDPC) coding, Polar coding, or the like may be applied. For the coding, a mother code with a low coding rate of 1/6 or 1/12 may be used in addition to a coding rate of 1/3. The modulating unit 2102 modulates coded bits input from the coding unit 2100, in compliance with the modulation scheme notified using the downlink control information or the modulation scheme predetermined in advance for each channel, such as BPSK, QPSK, 16QAM, 64QAM, or 256QAM (the modulation scheme may include π/2 shift BPSK, π/2 shift QPSK).

The spreading unit 2106 multiples a sequence output from the modulating unit 2102 by the spreading code sequence in accordance with the configuration of the spreading code sequence input from the controller 208. The configuration of the spreading code sequence is associated with other configurations regarding the grant free access such as the demodulation reference signal (this will be described below in detail). Note that spread processing may be performed on a sequence resulting from DFT processing. Note that, in a case that interleave is configured as a multi-access signature resource, the spreading unit 2106 can be replaced with an interleave unit. The interleave unit performs interleave processing on a sequence output from the DFT unit in accordance with the configuration of the interleave pattern input from the controller 208. In a case that code spreading and interleaving are configured as multi-access signature resources, the transmitter 210 includes the spreading unit 2106 and the interleave unit. This also applies to a case that any other multi-access signature resource is applied.

The DFT unit 2104 rearranges, in parallel, spread modulation symbols output from the spreading unit 2106, and then performs Discrete Fourier Transform (DFT) on the rearranged modulation symbols. Here, DFT may be performed with a zero symbol sequence added to the modulation symbols such that a time signal resulting from IFFT has a signal waveform including zero sections instead of CPs. Furthermore, DFT may be performed with a particular sequence such as a Gold sequence or a Zadoff-Chu sequence added to the modulation symbols such that the time signal resulting from IFFT has a signal waveform including particular patterns instead of CPs. However, in a case that the signal waveform is based on OFDM, DFT is not applied. The controller 208 performs control using the configuration of the zero symbol sequence (the number of bits in the symbol sequence or the like) and/or the configuration of the particular sequence (sequence seed, sequence length, or the like) included in the configuration information about the grant free access.

The uplink reference signal generation unit 2112 generates a demodulation reference signal in accordance with the configuration information about the demodulation reference signal input from the controller 208. The configuration information about the demodulation reference signal is associated with the configuration regarding the grant free access (configuration regarding the multi-access physical resource/multi-access signature resource). The configuration information about the demodulation reference signal generates a sequence determined according to a predetermined rule (for example, Equation (1)) based on a physical cell identity (PCI, also referred to as a Cell ID or the like) for identifying the base station apparatus 10, the number of subcarriers (bandwidth) to which the uplink reference signal is mapped, the number of OFDM symbols, the cyclic shift, the OCC sequence, and the like.

The multiplexing unit 2108 multiplexes (maps) the uplink physical channel (output signal from the DFT unit 2104) and/or the uplink reference signal for each transmit antenna port. The multiplexing unit 2108 maps the uplink physical channel signal, the uplink reference signal to resource elements for each transmit antenna port. In a case of use of SCMA, the multiplexing unit 2108 maps the uplink physical channel to the resource elements in accordance with an SCMA resource pattern input from the controller 208. The SCMA resource pattern may be included in the configuration information about the grant free access.

Figure 4:
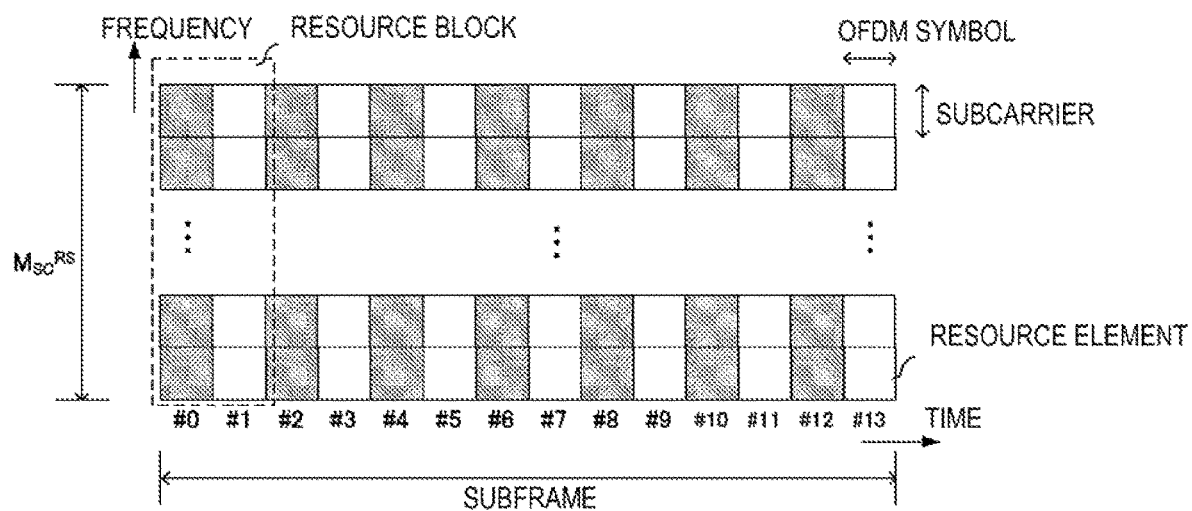
FIG. 4 is a diagram illustrating an example of uplink physical channel mapping according to the first embodiment.

FIG. 4 is a diagram illustrating an example of uplink physical channel mapping according to the present embodiment. Hatched portions indicate the resource elements to which the demodulation reference signal is mapped. Blank portions indicate the resource elements to which the uplink physical channel is mapped. The demodulation reference signal is mapped to one of multiple OFDM symbols constituting a resource block (in FIG. 4, two OFDM symbols). The demodulation reference signal is mapped to at least the leading OFDM symbol of the range of OFDM symbols to which the uplink physical channel is mapped. For example, in a case of transmitting the uplink physical channel using one resource block consisting of OFDM symbols #0 and #1, the terminal apparatus 20 maps, to the OFDM symbol #0, the demodulation reference signal generated by the uplink reference signal generation unit 2112, and maps, to the OFDM symbol #0, the uplink physical channel output from the spreading unit 2106. The demodulation reference signal sequence to be mapped to the OFDM symbol #0 is a sequence not multiplied by the OCC sequence (sequence multiplied by an OCC sequence w(0)=1).

Figure 5:
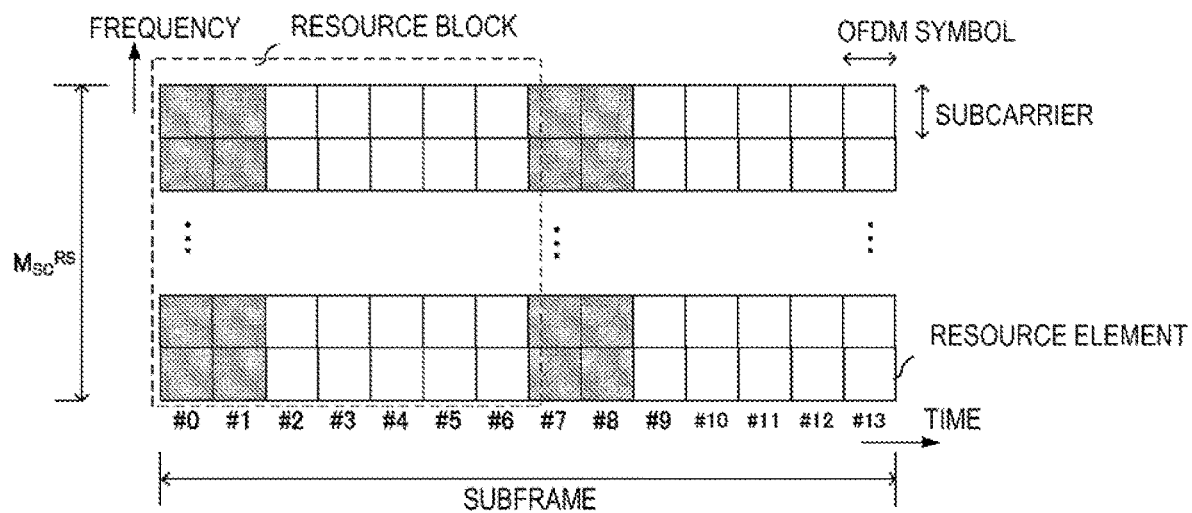
FIG. 5 is a diagram illustrating another example of uplink physical channel mapping according to the first embodiment.

FIG. 5 is a diagram illustrating another example of uplink physical channel mapping according to the present embodiment. (Hatched portions indicate the resource elements to which the demodulation reference signal is mapped. Blank portions indicate the resource elements to which the uplink physical channel is mapped). The demodulation reference signal is mapped to multiple OFDM symbols of the multiple OFDM symbols constituting a resource block (FIG. 5 is a configuration example in which the demodulation reference signal is mapped to two OFDM symbols in one resource block constituted by seven OFDM symbols (configuration example of m=0, 1 in Equation (1)). The demodulation reference signal is mapped to at least the leading OFDM symbol of the range of OFDM symbols to which the uplink physical channel is mapped. For example, in a case of transmitting the uplink physical channel using one resource block consisting of OFDM symbols #0 to #6, the terminal apparatus 20 maps, to the OFDM symbols #0 and #1, the demodulation reference signal generated by the uplink reference signal generation unit 2112, and maps, to the OFDM symbols #2 to #6, the uplink physical channel output from the spreading unit 2106. The demodulation reference signal sequence to be mapped to the OFDM symbols #0 and #1 is multiplied by the OCC sequence in the time domain (the OFDM symbol #0 is multiplied by an OCC value w(0) with m=0, and the OFDM symbol #1 is multiplied by an OCC value w(1) with m=1).

Note that the demodulation reference signal may be mapped to multiple OFDM symbols at prescribed spacings. For example, the demodulation reference signal is mapped to the OFDM symbols #0, #4, #8, #12. In FIGS. 4 and 5, an example is illustrated in which each terminal apparatus transmits the uplink physical channel by using one resource block. However, the present invention is not limited to this. For example, the terminal apparatus 20 can map the uplink physical channel by using multiple resource blocks in the frequency domain. Furthermore, the demodulation reference signal may be mapped to only some of the subcarriers (for example, every other subcarrier) in the OFDM symbol to which the demodulation reference signal is mapped.

The radio transmitting unit 2110 performs Inverse Fast Fourier Transform (IFFT) on the multiplexed signal for SC-FDMA modulation, thus generating SC-FDMA symbols. The radio transmitting unit 2110 adds CPs to the SC-FDMA symbols to generate a baseband digital signal. The radio transmitting unit 2110 further converts the baseband digital signal into an analog signal, removes unnecessary frequency components, performs an up-conversion into a carrier frequency, amplifies power, and transmits the resultant signal to the base station apparatus 10 through the transmit antenna 212. The radio transmitting unit 2110 includes a transmit power control function (transmit power controller). The transmit power control complies with the configuration information about the transmit power input from the controller 208. The configuration information about the transmit power is associated with the configuration information about the grant free access. Note that, in a case of application of FBMC, UF-OFDM, or F-OFDM, filter processing is performed on the SC-FDMA symbols (or OFDM symbols) in units of subcarriers or subbands.

FIG. 6 is a diagram illustrating an example of a table indicating association of configuration parameters in the grant free access according to the first embodiment. The multi-access signature process index is information indicating association of a mark identifying the uplink physical channel in the grant free access. FIG. 6 illustrates an example in which the multi-access signature process index (MA signature process index) indicates association between a demodulation reference signal index (DMRS Index) with a Spreading Code Index. The demodulation reference signal indexes are associated with the spreading code indexes on a one-to-one basis. The demodulation reference signal index is associated with the spreading code index such that the demodulation reference signal index and the spreading code index form a unique pair (multi-access signature process index). FIG. 6 illustrates an example in which the demodulation reference signal index and the spreading code index constituting the multi-access signature process index are selected from eight demodulation reference signal sequences and four spreading code sequences. The base station apparatus 10 and the terminal apparatus 20 can uniquely specify (identify) the demodulation reference signal sequence and the spreading code sequence by using the multi-access signature process index (or the demodulation reference signal index). The base station apparatus 10 and the terminal apparatus 20 can uniquely specify (identify) the spreading code sequence by using the demodulation reference signal index. The base station apparatus 10 and the terminal apparatus 20 can uniquely specify, in a given cell, the spreading code by using the spreading code index (for example, in a case of a spreading code sequence consisting of 2 bits, the spreading code indexes (0, 1, 2, 3)=([1 1 1 1], [1 −1 −1 1], [1 1 −1 −1], [1 −1 1 −1])). The base station apparatus 10 and the terminal apparatus 20 can uniquely specify (identify), in a given cell, the demodulation reference signal sequence by using the demodulation reference signal index associated with the cyclic shift index/OCC index used to generate a demodulation reference signal. FIG. 7 illustrates an example in which the demodulation reference signal index is associated with the cyclic index/OCC index. FIG. 7 illustrates an example in which the eight demodulation reference signal indexes in FIG. 6 are uniquely determined using eight cyclic indexes. In FIG. 7, in a case that no OCC index is specified, the OCC sequence w(0)=1 can be configured.

FIG. 8 is another example of a table indicating association of the configuration parameters in the grant free access according to the present embodiment. The demodulation reference signal indexes are associated with the spreading code indexes on a one-to-one basis. FIG. 8 illustrates an example in which the demodulation reference signal index and the spreading code index constituting the multi-access signature process index are selected from 16 demodulation reference signals and four spreading code sequences. The base station apparatus 10 and the terminal apparatus 20 can uniquely specify (identify) the demodulation reference signal sequence and the spreading code sequence by using the multi-access signature process index (or the demodulation reference signal index). The demodulation reference signal index and the spreading code index respectively uniquely indicate a demodulation reference signal sequence and a spreading code sequence in a given cell. FIG. 9 illustrates another example in which the demodulation reference signal index is associated with the cyclic index/OCC index. The 16 demodulation reference signal indexes in FIG. 8 are examples of demodulation reference signal indexes uniquely determined using eight cyclic indexes/two OCC indexes in accordance with FIG. 9.

In the description of FIGS. 6 and 8, the demodulation reference signal is associated with the spreading code. The present invention is not limited to this. For example, in a case that the uplink physical channel is interleaved, the spreading code indexes in FIGS. 6 and 8 can be replaced with interleave pattern indexes. In a case that both spreading code and interleaving are applied, the demodulation reference signal indexes are associated with the spreading code indexes and the interleave pattern indexes on a one-to-one basis. In this case, the base station apparatus 10 and the terminal apparatus 20 can uniquely specify (identify) the demodulation reference signal sequence, the spreading code sequence, and the interleave pattern index by using the multi-access signature process index (or the demodulation reference signal index).

The base station apparatus 10 and the terminal apparatus 20 hold look-up tables in FIG. 6 to FIG. 9 in advance. For a configuration in which the demodulation reference signal is mapped to one OFDM symbol, the base station apparatus 10 and the terminal apparatus 20 assume FIG. 6 as a look-up table. For the configuration in which the demodulation reference signal is mapped to one OFDM symbol, the base station apparatus 10 can notify the terminal apparatus 20 of an instruction to reference the table in FIG. 6. For a configuration in which the demodulation reference signal is mapped to two OFDM symbols, the base station apparatus 10 and the terminal apparatus 20 assume FIG. 8 as a look-up table. For the configuration in which the demodulation reference signal is mapped to two OFDM symbols, the base station apparatus 10 can notify the terminal apparatus 20 of an instruction to reference the table in FIG. 8. The notification of the look-up table may be associated with a notification of the number of OFDM symbols in the resource block (the number of OFDM symbols in a slot or a minislot). The information indicating the look-up table may be notified using the physical broadcast channel/RRC/SIB/downlink control channel.

The terminal apparatus 20 receives the multi-access signature process index from the base station apparatus 10. The multi-access signature process index may be notified using RRC signalling/SIB/downlink control channel. The control-ler 208 controls the spreading code sequence and the parameters (cyclic shift, OCC sequence) for generation of a demodulation reference signal sequence in accordance with the look-up table, based on the multi-access signature process index acquired from the receiver 204/higher layer processing unit 206. For example, in a case that information indicating mapping of the demodulation reference signal sequence to two OFDM symbols and the multi-access signature process index #6 (demodulation reference signal index #6) are input to the controller 208, the controller 208 uses the look-up tables in FIG. 8 and FIG. 9 to control the parameters for generation of a demodulation reference signal and a spreading code. In this case, the controller 208 inputs the cyclic shift index #3 and the OCC index #0 to the uplink reference signal generation unit 2112. The controller 208 further inputs the spreading code index #2 to the spreading code unit 2106. The spreading unit 2106 generates a spreading code sequence by the controller 208 in accordance with the instruction. The uplink reference signal generation unit 2112 generates a demodulation reference signal in accordance with the cyclic shift and the OCC sequence indicated by the controller 208. Note that the base station apparatus 10 may notify the demodulation reference signal index instead of the multi-access signature process index. The controller 208 of the terminal apparatus 20 uses the spreading code index specified by the demodulation reference signal index to control the receiver and the transmitter.

As described above, in the grant free access, the demodulation reference signal is associated with the configuration parameters (parameters to be generated such as the spreading code sequence/interleave pattern) of the multi-access signature resource applied to the uplink physical channel on a one-to-one basis. The terminal apparatus 20 can acquire the information (demodulation reference signal index) for identification of the demodulation reference signal sequence to uniquely identify the spreading code sequence/interleave pattern applied to the uplink physical channel transmitted in association with the demodulation reference signal. Thus, the base station apparatus 10 and the terminal apparatus 20 can reduce the configuration information regarding the uplink transmission in the grant free access.

Note that the notification of the demodulation reference signal index may be replaced with a notification of the cyclic index/OCC index. For example, in a case that the terminal apparatus 20 receives the notification of the cyclic shift index #3 and the OCC index #0 from the base station apparatus 10, the controller 208 determines the demodulation reference signal index #6 and outputs the spreading code index #2 to the spreading unit 2106. In a case of receiving both the multi-access signature process index and the demodulation reference signal index, the terminal apparatus 20 may give priority to the configuration associated with the multi-access signature process index. In a case of receiving both the multi-access signature process index and the cyclic shift index/OCC index, the terminal apparatus 20 may give priority to the configuration associated with the demodulation reference signal index.

FIG. 10 is another example of a table indicating association of the configuration parameters in the grant free access according to the present embodiment. This is an example in which one multi-access signature process index (or one demodulation reference signal index) is associated with multiple spreading code indexes. In FIG. 10, one multi-access signature process index is associated with two spreading code indexes (Spreading Code index 0, Spreading Code index 1). The demodulation reference signal indexes in FIG. 10 are associated with the look-up table in FIG. 9.

Each spreading code index pattern is associated with the number of retransmissions (initial transmission or retransmission). The controller 208 of the terminal apparatus 20 changes the spreading code index pattern to be referenced, according to the number of retransmissions. For example, in a case that the number of retransmissions is one (in a case of an initial transmission), the terminal apparatus 20 controls the spreading code sequence in accordance with the spreading code index pattern 0 (Spreading Code index 0) associated with the multi-access signature process index received from the base station apparatus. In a case that the number of retransmissions is two, the terminal apparatus 20 controls the spreading code sequence in accordance with the spreading code index pattern 1 (Spreading Code index 1) associated with the multi-access signature process index received from the base station apparatus. Moreover, in a case that the number of retransmissions is three, the terminal apparatus 20 controls the spreading code sequence in accordance with Spreading Code index 0 associated with the multi-access signature process index received from the base station apparatus. Note that the number of spreading code index patterns is not limited to this.

As described above, one multi-access signature process index (or one demodulation reference signal index) is associated with multiple spreading code index patterns. This allows the terminal apparatus 20 to change, during retransmission, the spreading code index without receiving the configuration of the multi-access signature process index again. Thus, thus, the base station apparatus 10 and the terminal apparatus 20 can suppress the increase of the overhead of the uplink transmission in the grant free access.

Figure 11:
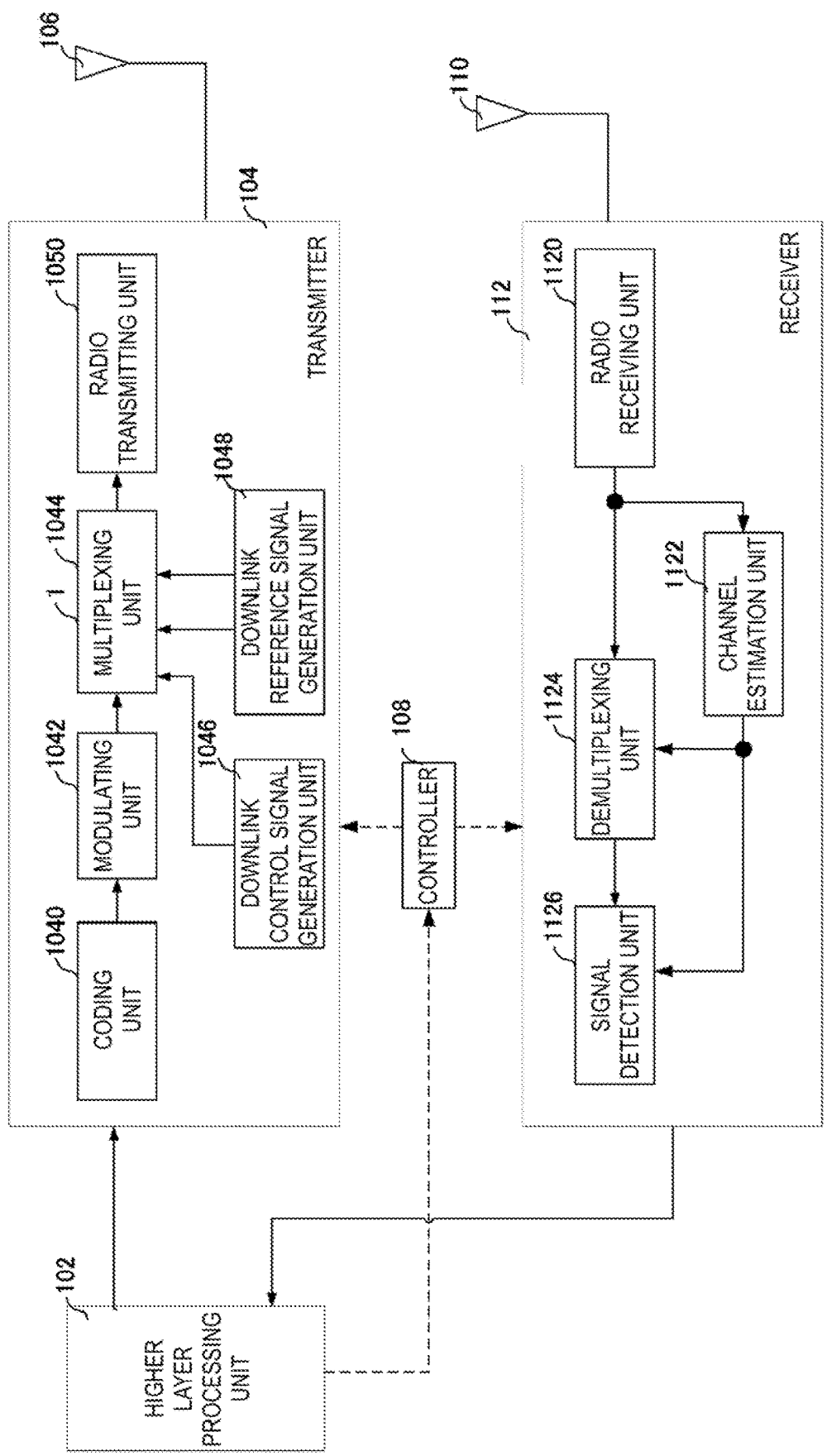
FIG. 11 is a schematic block diagram illustrating a configuration of the base station apparatus 10 according to the present embodiment according to the first embodiment.

FIG. 11 is a schematic block diagram illustrating a configuration of the base station apparatus 10 according to the present embodiment. The base station apparatus 10 is configured to include a higher layer processing unit (higher layer processing step) 102, a transmitter (transmitting step) 104, a transmit antenna 106, a controller (control step) 108, a receive antenna 110, and a receiver (receiving step) 112. The transmitter 104 is configured to include a coding unit (coding step) 1040, a modulating unit (modulating step) 1042, a multiplexing unit (multiplexing step) 1044, a downlink control signal generation unit (downlink control signal generating step) 1046, a downlink reference signal generation unit (downlink reference signal generating step) 1048, and a radio transmitting unit (radio transmitting step) 1050. The receiver 112 is configured to include a radio receiving unit (radio receiving step) 1120, a channel estimation unit (channel estimating step) 1122, a demultiplexing unit (demultiplexing step) 1124, and a signal detection unit (signal detecting step) 1126.

The higher layer processing unit 102 performs processing of layers higher than the physical layer such as the Medium Access Control (MAC) layer, the Packet Data Convergence Protocol (PDCP) layer, the Radio Link Control (RLC) layer, and the Radio Resource Control (RRC) layer. The higher layer processing unit 102 generates information necessary for control of the transmitter 104 and the receiver 112, and outputs the generated information to the controller 108. The higher layer processing unit 102 outputs downlink data (for example, DL-SCH), broadcast information (for example, BCH), a Hybrid Automatic Request indicator (HARQ indicator), and the like to the transmitter 104.

The higher layer processing unit 102 receives information about the terminal apparatus, such as the UE capability or the like, from the terminal apparatus 20 (via the receiver 112). The information about the terminal apparatus includes information indicating support of the grant free access and information indicating whether to support each of the functions of the grant free access. For the information indicating support of the grant free access, the information indicating whether to support each of the functions, distinctions may depend on the transmission mode. The higher layer processing unit 102 can determine whether the grant free access is supported based on the transmission mode supported by the terminal apparatus 20.

The higher layer processing unit 102 generates system information (MIB, SIB) to be broadcasted or acquires the system information from a higher node. The higher layer processing unit 102 outputs, to the transmitter 104, the system information to be broadcasted. The system information to be broadcasted can include information indicating that the base station apparatus 10 supports the grant free access. The higher layer processing unit 102 can include a part or all of the configuration information about the grant free access (for example, the configuration information about multi-access resources such as the multi-access physical resource and the multi-access signature resource). The system control information of uplink is mapped, in the transmitter 104, to the physical broadcast channel/physical downlink shared channel.

The higher layer processing unit 102 generates, or acquires from a higher node, downlink data (transport block) to be mapped to the physical downlink shared channel, system information (SIB), an RRC message, a MAC CE, and the like, and performs output to the transmitter 104. The higher layer processing unit 102 can include, in the higher layer signalling, a part or all of the configuration information about the grant free access, the parameter indicating setup and/or release of the grant free access. The higher layer processing unit 102 may generate dedicated SIB for notifying the configuration information about the grant free access.

The higher layer processing unit 102 maps the multi-access resources to the terminal apparatus 20 supporting the grant free access. The base station apparatus 10 holds the look-up tables for the configuration parameters regarding the multi-access resources in FIG. 6 to FIG. 10. The higher layer processing unit 102 allocates the configuration parameters to the terminal apparatus 20 in accordance with the look-up tables. For example, for a configuration in which the demodulation reference signal is mapped to two OFDM symbols, the higher layer processing unit 102 allocates the multi-access signature process index to each terminal apparatus in accordance with the tables in FIG. 8 and FIG. 9. The base station apparatus 10 maps the multi-access signature process index to the terminal apparatus 20 successfully connected to the base station apparatus 10. The higher layer processing unit 102 uses the multi-access signature process index to generate configuration information about the grant free access for each terminal apparatus (generate configuration information about the grant free access including the multi-access signature process index). The higher layer processing unit 102 generates a downlink shared channel including a part or all of the configuration information about the grant free access for each terminal apparatus. The higher layer processing unit 102 outputs the configuration information about the grant free access to the controller 108/transmitter 104.

The higher layer processing unit 102 configures the UE ID for each terminal apparatus and notifies the terminal apparatus of the UE ID. For the UE ID, the Cell-Radio Network Temporary Identifier (C-RNTI) can be used. The UE ID is used to scramble the CRC added to the downlink control channel and/or the downlink shared channel. The UE ID is used to scramble the CRC added to the uplink shared channel. The UE ID is used to generate an uplink reference signal sequence. The higher layer processing unit 102 may configure a UE ID unique to the grant free access. The higher layer processing unit 102 may configure the UE ID depending on whether the terminal apparatus supports the grant free access. For example, in a case that the downlink physical channel is transmitted using the scheduled access and the uplink physical channel is transmitted using the grant free access, the UE ID for downlink physical channel may be configured differently from the UE ID for downlink physical channel. The higher layer processing unit 102 outputs the configuration information about the UE ID to the transmitter 104/controller 108/receiver 112.

The higher layer processing unit 102 determines the coding rate, modulation scheme (or MCS), transmit power, and the like of the physical channel (physical downlink shared channel, physical uplink shared channel, or the like). The higher layer processing unit 102 outputs the coding rate/modulation scheme/transmit power to the transmitter 104/controller 108/receiver 112. The higher layer processing unit 102 can include the coding rate/modulation scheme/transmit power in the higher layer signaling.

Based on various types of configuration information input from the higher layer processing unit 102, the controller 108 controls the transmitter 104 and the receiver 112. The controller 108 generates downlink control information (DCI), based on the configuration information about downlink transmission and uplink transmission input from the higher layer processing unit 102, and outputs the generated information to the transmitter 104. The controller 108 can include a part or all of the configuration information about the grant free access in the downlink control information.

The controller 108 controls the receiver 112 in accordance with the configuration information about the grant free access input from the higher layer processing unit 102. The controller 108 controls the demodulation reference signal sequence used for channel estimation and identification of the terminal apparatus, for the channel estimation unit 1122 in accordance with the multi-access signature process index input from the higher layer processing unit 102. The controller 108 controls the spreading code sequence used for despreading, for the signal detection unit 1126 in accordance with the spreading code index associated with the multi-access signature process index (or the demodulation reference signal index). Note that the functions of the controller 108 can be included in the higher layer processing unit 102.

The transmitter 104 codes and modulates the broadcast information, the downlink control information, the downlink shared channel, and the like input from the higher layer processing unit 102 to generate a physical broadcast channel, a physical downlink control channel and/or physical downlink shared channel, for each terminal apparatus. The coding unit 1040 uses the coding scheme determined in advance/coding scheme determined by the higher layer processing unit 102 to code the broadcast information, the downlink control information and/or the downlink control information (including repetition). For the coding scheme, convolutional coding, turbo coding, Low Density Parity Check (LDPC) coding, Polar coding, or the like may be applied. The modulating unit 1042 modulates the coded bits input from the coding unit 1040, in compliance with the coding scheme determined in advance/coding scheme determined by the higher layer processing unit 102, such as BPSK, QPSK, 16QAM, 64QAM, or 256QAM.

The downlink control information generation unit 1046 adds the CRC to the downlink control information input from the controller 108 to generate a physical downlink control channel. The downlink control information includes a part or all of the configuration information about the grant free access. The CRC is scrambled with the UE ID allocated to each terminal apparatus. The downlink reference signal generation unit 1048 generates a downlink reference signal. The downlink reference signal is determined by a predetermined rule based on, for example, the UE ID for identifying the base station apparatus 10.

The multiplexing unit 1044 maps the modulation symbols of each modulated downlink physical channel, the physical downlink control channel, and the downlink reference signal to the resource elements. The multiplexing unit 1044 maps the physical downlink shared channel, the physical downlink control signal to the resource allocated to each terminal apparatus.

The radio transmitting unit 1050 performs Inverse Fast Fourier Transform (IFFT) on the modulation symbols of each multiplexed downlink physical channel, thus generating OFDM symbols. The radio transmitting unit 1050 adds cyclic prefixes (CPs) to the OFDM symbols to generate a baseband digital signal. The radio transmitting unit 1050 further converts the digital signal into an analog signal, removes unnecessary frequency components by filtering, performs an up-conversion into a carrier frequency, amplifies power, and outputs the resultant signal to the transmit antenna 106 to transmit.

The receiver 112 detects the uplink physical channel transmitted from the terminal apparatus 20 by the grant free access, by using the demodulation reference signal associated with the channel. The receiver 112 identifies the terminal apparatus of each terminal apparatus and detects the uplink physical channel, based on the configuration information about the grant free access configured for the terminal apparatus.

The radio receiving unit 1120 converts, by down-conversion, an uplink signal received through the receive antenna 110 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1120 removes portions corresponding to the CPs from the digital signal resulting from the conversion. The radio receiving unit 1120 performs Fast Fourier Transform (FFT) on the signal from which the CPs have been removed, and extracts a frequency domain signal.

The channel estimation unit 1122 uses the demodulation reference signal to perform identification of the terminal apparatus and channel estimation for signal detection of the uplink physical channel. The channel estimation unit 1122 receives, from the controller 108, the resource to which the demodulation reference signal is mapped (hatched portions in FIG. 4 and FIG. 5) and the demodulation reference signal sequence allocated to each terminal apparatus (demodulation reference signal sequence based on the multi-access signature index mapped to each terminal apparatus). The channel estimation unit 1122 uses the demodulation reference signal sequence to measure a channel state between the base station apparatus 10 and the terminal apparatus 20. For example, in a case that the higher layer processing unit 102 sequentially allocates the demodulation reference signal indexes #0 to #7 to the terminal apparatus 20-1 to the terminal apparatus 20-8 based on the look-up table in FIG. 8, the channel estimation unit 1122 uses the eight demodulation reference signals (demodulation reference signal indexes #0 to #7) in the resource to which the demodulation reference signal is mapped, to perform blind channel estimation (for example, correlation processing and filtering processing using the demodulation reference signal sequence). The channel estimation unit 1122 can identify the terminal apparatus (the channel estimation unit 1122 is thus also referred to as an identification unit) by using a result of the channel estimation (impulse response, frequency response for the channel state). The channel estimation unit 1122 determines that the terminal apparatus associated with the demodulation reference signal having successfully extracted the channel state has transmitted the uplink physical channel. The demultiplexing unit 1124 extracts a frequency domain signal input from the radio receiving unit 1120 (the signal includes signals from multiple terminal apparatuses), from the resource in which the channel estimation unit 1122 determines that the uplink physical channel has been transmitted.

The signal detection unit 1126 uses the channel estimation result and the frequency domain signal input from the demultiplexing unit 1124 to detect the signal for the uplink data (uplink physical channel) from each terminal apparatus. The signal detection unit 1126 performs signal detection processing using the spreading code sequence associated with the demodulation reference signal allocated to the terminal apparatus determined to have transmitted the uplink data (demodulation reference signal having successfully extracted the channel state).

The higher layer processing unit 102 acquires the decoded uplink data (bit sequence resulting from hard decision) of each terminal apparatus from the signal detection unit 1126. The higher layer processing unit 102 descrambles (performs an EXCLUSIVE-OR operation on) the CRC included in the decoded uplink data of each terminal apparatus, by using the UE ID allocated to each terminal. In a case that error detection based on the descrambling results in detection of no error in the uplink data, the higher layer processing unit 102 determines that the identification of the terminal apparatus has been correctly completed and that the uplink data transmitted from the terminal apparatus has been correctly received.

Figure 12:
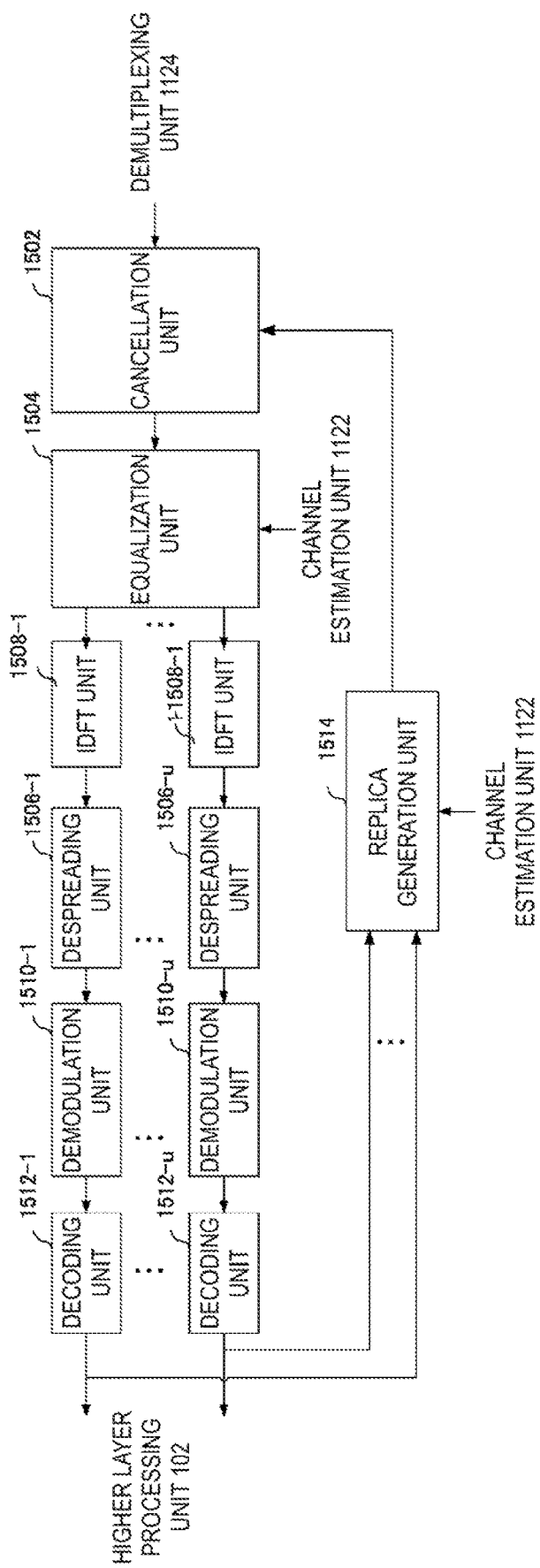
FIG. 12 is a diagram illustrating an example of a signal detection unit according to the first embodiment.

FIG. 12 is a diagram illustrating an example of the signal detection unit according to the present embodiment. The signal detection unit 1126 includes a cancellation unit 1502, an equalization unit 1504, despreading units 1506-1 to 1506-$u$, IDFT units 1508-1 to 1508-$u$, demodulation units 1510-1 to 1510-$u$, decoding units 1512-1 to 1512-$u$, and a replica generation unit 1514. u is the number of terminal apparatuses determined by the channel estimation unit 1122 to have transmitted the uplink data (terminal apparatuses from which the channel state has been extracted) in the same multi-access physical resource or an overlapping multi-access physical resource (at the same time and at the same frequency). The units constituting the signal detection unit 1126 are controlled using the configurations for each terminal apparatus input from the controller 108 and regarding the grant free access.

The cancellation unit 1501 subtracts a soft replica input from the replica generation unit 1514, from the frequency domain signal input from the demultiplexing unit 1124 (including signals from each terminal apparatus) (cancellation processing). The equalization unit 1504 generates equalization weights based on an MMSE criterion, from the frequency response input from the channel estimation unit 1122. The equalization unit 1504 multiplies, by the equalization weights, the frequency domain signal after soft cancellation, to extract the frequency domain signal from each terminal apparatus. The equalization unit 1504 outputs, to the IDFT units 1508-1 to 1508-$u$, the equalized frequency domain signal from each terminal apparatus.

The IDFT units 1508-1 to 1508-$u$ convert the equalized frequency domain signal from each terminal apparatus into a time domain signal. Note that the IDFT units 1508-1 to 1508-$u$ correspond to the processing performed by the DFT unit 2104 of the terminal apparatus 20. The despreading units 1506-1 to 1506-$u$ multiply, by the spreading code sequence, the time domain signal from each terminal apparatus resulting from IDFT (despread processing). Each of the despreading units 1506-1 to 1506-$u$ performs despread processing using the spreading code sequence associated with the demodulation reference signal index allocated to each terminal apparatus. In a case that the terminal apparatus 20 has been performed spread processing on the signal resulting from DFT, despread processing is performed on the signal before IDFT. Note that, in a case that interleaving is applied as a multi-access signature resource, deinterleave processing is performed on the time domain signal from each terminal apparatus after IDFT (deinterleave unit). The deinterleave unit performs deinterleave processing by using the interleave pattern associated with the demodulation reference signal index allocated to each terminal apparatus.

The demodulation units 1510-1 to 1510-$u$ receive, from the controller 108, the information about the modulation scheme for each terminal apparatus notified or determined in advance. The demodulation units 1510-1 to 1510-$u$ perform demodulation processing on the despread signal, based on the information about the modulation scheme to output a Log Likelihood Ratio (LLR) of the bit sequence.

The decoding units 1512-1 to 1512-$u$ receive, from the controller 108, the information about the coding rate notified or determined in advance. The decoding units 1512-1 to 1512-$u$ perform decoding processing on the sequence of LLRs output from the demodulation units 1510-1 to 1510-$u$. To perform cancellation processing such as Successive Interference Canceller (SIC) or turbo equalization, the decoding units 1512-1 to 1512-$u$ outputs, to the replica generation unit 1514, external LLRs or post-LLRs corresponding to decoding unit outputs. A difference between the external LLRs and the post-LLRs lies in whether pre-LLRs input to the decoding units 1512-1 to 1512-$u$ are subtracted from the decoded LLRs. In a case that the number of repetitions of SIC or turbo equalization is larger than or equal to a prescribed value, the decoding units 1512-1 to 1512-$u$ performs hard decision on the LLRs resulting from decoding processing. The decoding units 1512-1 to 1512-$u$ then output, to the higher layer processing unit 102, the bit sequence of the uplink data from each terminal apparatus.

The replica generation unit 1514 processes the LLR sequence input from each decoding unit into a symbol replica of each terminal apparatus according to the modulation scheme applied to the uplink data by each terminal apparatus. The replica generation unit 1514 multiplies the symbol replica by the spreading code sequence applied to the uplink data by each terminal apparatus. The replica generation unit 1514 further converts, into a frequency domain signal by DFT, the signal resulting from the multiplication by the spreading code sequence. The replica generation unit 1514 then multiplies the signal resulting from DFT by the frequency response input from the channel estimation unit 1122 to generate a soft replica. Note that, in FIG. 8, the signal detection using the turbo equalization processing has been described but that maximum likelihood detection, EMMSE-IRC, or the like may be used.

Figure 13:
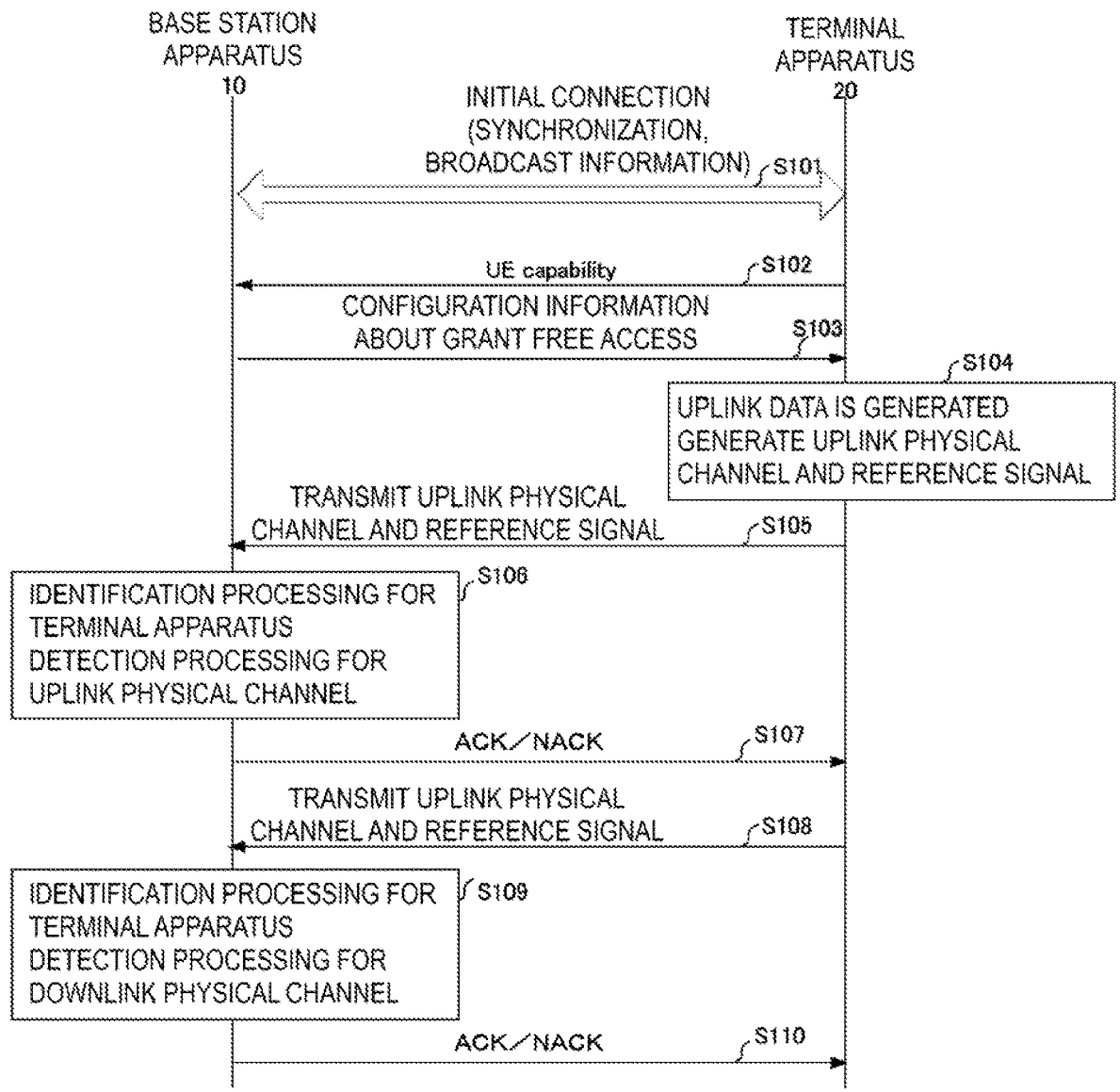
FIG. 13 is a diagram illustrating an example of a sequence between the base station apparatus and the communication device in the grant free access according to the first embodiment.

FIG. 13 is a diagram illustrating an example of a sequence between the base station apparatus and the communication device in the grant free access according to the present embodiment. The base station apparatus 10 periodically transmits, in the downlink, a synchronization signal and/or a broadcast channel in accordance with a prescribed radio frame format. The terminal apparatus 20 uses the synchronization signal, the broadcast channel, and/or the like for initial connection (S101). The terminal apparatus 20 uses the synchronization signal for frame synchronization and/or symbol synchronization in the downlink. In a case that the broadcast channel includes the configuration information about the grant free access, the terminal apparatus 20 acquires the configurations regarding the grant free access in the connected cell. The base station apparatus 10 can notify, in initial connection, each terminal apparatus 20 of the UE ID.

The terminal apparatus transmits the UE Capability (S102). The base station apparatus can use the UE Capability to specify whether the terminal apparatus supports the grant free access. Note that, in S101 to S103, the terminal apparatus can transmit the physical random access channel in order to acquire a resource for uplink synchronization or an RRC connectivity request.

The base station apparatus 10 uses the RRC message, the SIB, and/or the like to transmit the configuration information about the grant free access to each terminal apparatus 20 (S103). The configuration information about the grant free access includes the multi-access signature process index) allocated based on FIG. 6 to FIG. 9. In a case of receiving the configuration information about the grant free access, the terminal apparatus 20 acquires the transmission parameters such as the spreading code sequence applied to the uplink data, based on FIG. 6 to FIG. 10. Note that a part or all of the configuration information about the grant free access may be notified using the downlink control information. Each terminal apparatus 20 uses the multi-access signature process index to acquire the demodulation reference signal, the spreading code sequence, and/or the like, used to transmit the uplink data.

The terminal apparatus 20 supporting the grant free access generates a demodulation reference signal allocated to the terminal apparatus 20 itself in a case that uplink data is generated. The terminal apparatus 20 further generates an uplink physical channel by using, for example, the spreading code sequence associated with the demodulation reference signal (S104). The terminal apparatus 20 transmits the uplink physical channel and the demodulation reference signal without obtaining the UL Grant from the base station apparatus 10 (S105).

The base station apparatus 10 performs identification processing on the terminal apparatus 20 by using the demodulation reference signal allocated to each terminal apparatus 20. The base station apparatus 10 further performs, for the identified terminal apparatus 20, uplink physical channel detection processing by using, for example, the spreading code sequence associated with the demodulation reference signal. The base station apparatus 10 further performs error detection processing using the UE ID allocated to each terminal apparatus (S106). The base station apparatus 10 transmits ACK/NACK to the terminal apparatus 20, based on the result of the error detection (S107). In a case that no error is detected in S106, the terminal apparatus 10 determines that identification of the terminal apparatus and reception of the uplink data transmitted by the terminal apparatus have been correctly completed. The terminal apparatus 10 then transmits ACK. On the other hand, in a case that an error is detected in S106, the terminal apparatus 10 determines that identification of the terminal apparatus or reception of the uplink data transmitted by the terminal apparatus has been failed. The terminal apparatus 10 then transmits NACK.

The terminal apparatus 20 receives the NACK and transmits the uplink physical channel and the reference signal again (S108). In a case that the look-up table in FIG. 10 is indicated by the base station apparatus 10, the terminal apparatus 20 changes the spreading code sequence index in accordance with the look-up table. The base station apparatus 10 performs the uplink physical channel detection processing on the retransmitted uplink physical channel (S109). The base station apparatus 10 further performs the error detection processing by using the UE ID allocated to each terminal apparatus (S109). The base station apparatus 10 transmits the ACK/NACK to the terminal apparatus 20 based on the result of the error detection (S110).

In the present embodiment, in the grant free access, the base station apparatus 10 allocates each terminal apparatus with the demodulation reference signal index associated with the spreading code sequence, and notifies each terminal apparatus of the demodulation reference signal index by using the multi-access signature process index. The base station apparatus 10 performs identification processing for the terminal apparatus by using the demodulation reference signal allocated to the terminal apparatus 20. In the identification processing, the base station apparatus 10 performs, on the terminal apparatus determined to have transmitted the uplink data, reception processing such as signal detection processing by using the spreading code sequence associated with the demodulation reference signal. Thus, the grant free access according to the present embodiment allows suppression of an increase in processing loads for identification of each terminal apparatus connected based on the non-orthogonal multiple access and for signal detection for the uplink data, and also allows suppression of a decrease in identification accuracy. Furthermore, the communication system according to the present embodiment enables a reduction in overhead resulting from the configuration information about the grant free access. Moreover, the base station apparatus 10 enables a reduction in the number of times of the identification of the terminal apparatus and the signal detection processing. Furthermore, the base station apparatus 10 can separately allocate the UE ID to each terminal apparatus (allocate the UE ID unassociated with the demodulation index to each terminal apparatus) and notify each terminal apparatus of the UE ID. Thus, the allocation of the demodulation reference signal index is changed to allow flexible dealing with an increased number of failures in identification of the terminal apparatus or biased allocation of the spreading code sequence.

Second Embodiment

The present embodiment is an example in which, in the grant free access, the demodulation reference signal is associated with the spreading code sequence and transmit power applied to the uplink physical channel. The communication system according to the present embodiment is constituted by the base station apparatus 10 and the terminal apparatus 20 described in FIG. 3, FIG. 10, and FIG. 11. Differences from/additions to the first embodiment will mainly be described.

FIG. 14 is an example of a table indicating association of the configuration parameters in the grant free access according to the present embodiment. The multi-access signature process index is associated with one demodulation reference signal index, one spreading code index and one transmit power index. The demodulation reference signal indexes, the spreading code indexes, and the transmit power indexes are associated with one another to make the multi-access signature process indexes unique. The base station apparatus 10 and the terminal apparatus 20 can uniquely specify the multi-demodulation reference signal index, the spreading code index, and the transmit power index by using the multi-access signature process index. The base station apparatus 10 and the terminal apparatus 20 can uniquely specify the transmit power index by using the multi-demodulation reference signal index and the spreading code index. In FIG. 14, the demodulation reference signal indexes are associated with the demodulation reference signal sequence in accordance with the table in FIG. 9. The spreading code indexes are uniquely associated with the spreading code sequence as is the case with FIG. 8. The transmit power indexes are associated with a transmit power value/target receive power value/maximum transmit power value. For example, the transmit power index constituted by 1 bit indicates transmit power as follows: transmit power index #0=AdBm, transmit power index #1=BdBm, (A<B). Here, the transmit power index may be the amount of increase or decrease in target receive power unique to the user, the value of a coefficient of fractional TPC, or the absolute value or cumulative value of a TPC command for a closed loop.

The base station apparatus 10 allocates the multi-access signature process index to the terminal apparatus 20 successfully connected to the base station apparatus 10. For example, for a configuration in which the demodulation reference signal is mapped to two OFDM symbols, the higher layer processing unit 102 allocates the multi-access signature process index to each terminal apparatus in accordance with the table in FIG. 14. The higher layer processing unit 102 generates, for each terminal apparatus, configuration information about the grant free access including the multi-access signature process index. For a configuration in which the demodulation reference signal is mapped to two OFDM symbols, the higher layer processing unit 102 can select the look-up table in FIG. 8 and the look-up table in FIG. 14. In this case, which of the tables is to be referenced is notified by configuration of the look-up table.

In a case that the look-up table in FIG. 14 is indicated by the base station apparatus 10, the controller 208 of the terminal apparatus 20 acquires the configurations of the spreading code and transmit power applied to the uplink physical channel and the demodulation reference signal sequence associated with the uplink physical channel, based on the multi-access signature process index included in the configuration information about the grant free access. The uplink reference signal generation unit 2112 generates a demodulation reference signal in accordance with generation parameters (cyclic shift, OCC sequence) for the demodulation reference signal associated with the multi-access signature process index. The spreading unit 2106 multiplies the sequence output from the DFT unit 2104 by the spreading code sequence associated with the multi-access signature process index. The transmit power control unit included in the radio transmitting unit 2110 performs transmit power control in accordance with the transmit power associated with the multi-access signature process index.

Within the range of the multi-access signature process indexes allocated to the terminal apparatuses 20, the channel estimation unit 1122 of the base station apparatus 10 performs identification of the terminal apparatus and channel estimation for signal detection of the uplink physical channel, using the demodulation reference signal associated with the multi-access signature process index, in accordance with the look-up table in FIG. 14. In accordance with the look-up table in FIG. 14, the signal detection unit 1126 performs identification of the terminal apparatus and signal detection of the uplink physical channel, using the information of the spreading code sequence and transmit power associated with the demodulation reference signal allocated to the terminal apparatus determined to have transmitted the uplink data (demodulation reference signal having successfully extracted the channel state). Each of the despreading units 1506-1 to 1506-$u$ performs despread processing by using the spreading code sequence associated with the demodulation reference signal index allocated to each terminal apparatus. In a case that the terminal apparatus 20 is allocated with multiple multi-access signature process indexes with an identical demodulation reference signal index and an identical spreading code index (for example, in a case that multi-access signature process index #0 is allocated to the terminal apparatus 20-1, and multi-access signature process index #1 is allocated to the terminal apparatus 20-2), the signal detection unit 1126 performs signal detection processing on the uplink physical channel of the terminal apparatus 20-2 to which the multi-access signature process index #1 with higher transmit power is allocated. The signal detection unit 1126 then subtracts, from a frequency domain signal input from the demultiplexing unit 1124, a soft replica resulting from the signal detection processing performed on the uplink physical channel from the terminal apparatus 20-2, and subsequently performs detection processing on the terminal apparatus 20-1, to which the multi-access signature process index #0 is allocated. Note that the base station apparatus 10 may transmit the demodulation reference signal index in accordance with the look-up table in FIG. 14. In this case, the base station apparatus 10 performs the signal detection processing by using the spreading code sequence and the transmit power associated with the demodulation reference signal index.

In the present embodiment, in the grant free access, the base station apparatus 10 allocates, to each terminal apparatus, the multi-access signature process index associated with one demodulation reference signal index, one spreading code sequence, and one transmit power index, and notifies each terminal apparatus of the multi-access signature process index. The base station apparatus 10 performs identification processing for the terminal apparatus by using the demodulation reference signal associated with the multi-access signature process index allocated to the terminal apparatus 20. In the identification processing, the base station apparatus 10 performs, on the terminal apparatus determined to have transmitted the uplink data, the reception processing such as signal detection processing by using the spreading code sequence and the transmit power information associated with the demodulation reference signal. Thus, the grant free access according to the present embodiment allows suppression of an increase in processing loads for identification of each terminal apparatus connected based on the non-orthogonal multiple access and for signal detection for the uplink data, and also allows suppression of a decrease in identification accuracy. Furthermore, the communication system according to the present embodiment enables a reduction in overhead resulting from the configuration information about the grant free access, while increasing the number of multi-access signature process indexes.

Third Embodiment

The present embodiment is an example in which, in a multicell environment, the base station apparatus supporting the grant free access associates with the spreading code sequence and transmit power applied to the uplink physical channel. The communication system according to the present embodiment is constituted by the base station apparatus 10 and the terminal apparatus 20 described in FIG. 3, FIG. 10, and FIG. 11. Differences from/additions to the first embodiment and the second embodiment will mainly be described.

Figure 15:
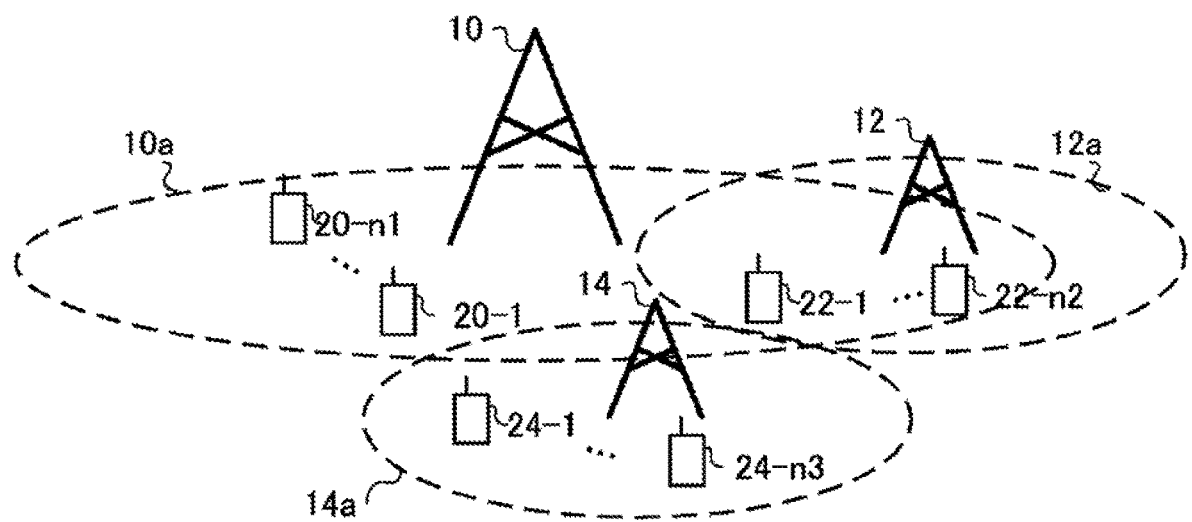
FIG. 15 is a diagram illustrating an example of a configuration of a communication system according to a third embodiment.

FIG. 15 is a diagram illustrating an example of a configuration of a communication system according to the present embodiment. The communication system according to the present embodiment includes base station apparatuses 10, 12 and 14, terminal apparatuses 20-1 to 20-n1, terminal apparatuses 22-1 to 22-n2, terminal apparatuses 24-1 to 24-n3 (each of n1, n2 and n3 is the number of terminal apparatuses connected to the base station apparatuses 10, 12 and 14). The terminal apparatuses 20-1 to 20-n1 are also collectively referred to as the terminal apparatus 20. Likewise, the terminal apparatuses 22-1 to 22-n1 are also collectively referred to as the terminal apparatus 22. The terminal apparatuses 24-1 to 24-n1 are also referred to as the terminal apparatus 24. Each of coverages 10a, 12a and 14a is a range (a communication area) in which the corresponding base station apparatus 10, 12 and 14 can connect to the terminal apparatuses. In FIG. 1, each of the base station apparatuses 10, 12 and 14 is connected to the terminal apparatuses 20, 22 and 24.

FIG. 16 is an example of a table indicating association of the configuration parameters in the grant free access according to the present embodiment. One multi-access signature process index is associated with one demodulation reference signal index. One multi-access signature process index is associated with multiple spreading code index patterns. In FIG. 16, one multi-access signature process index is associated with three spreading code index patterns (Spreading Code index 0, Spreading Code index 1, Spreading Code index 2). The spreading code index patterns can be associated with cells of the base station apparatus. For example, in FIG. 16, spreading code index pattern 0 (Spreading Code index 0), spreading code index pattern 1 (Spreading Code index 1), and spreading code index pattern 2 (Spreading Code index 2) are associated with cells 10a, 12a and 14a in FIG. 15. Note that the number of spreading code index patterns can be increased according to the length of the spreading code sequence.

In each of the cells, the demodulation reference signal indexes are associated with the spreading code index patterns so as to make the multi-access signature process indexes unique. The base station apparatus 10 and the terminal apparatus 20 can uniquely specify (identify) the demodulation reference signal sequence and the spreading code sequence by using the multi-access signature process index associating the demodulation reference signal index with spreading code index pattern 0. The base station apparatus 10 and the terminal apparatus 20 can uniquely specify (identify) the spreading code sequence at spreading code index pattern 0 by using the demodulation reference signal index.

The base station apparatus 12 and the terminal apparatus 22 can uniquely specify (identify) the demodulation reference signal sequence and the spreading code sequence by using the multi-access signature process index associating the demodulation reference signal index with spreading code index pattern 1. The base station apparatus 14 and the terminal apparatus 24 can uniquely specify (identify) the demodulation reference signal sequence and the spreading code sequence by using the multi-access signature process index associating the demodulation reference signal index with spreading code index pattern 2.

For each of the multi-access signature process indexes, combinations of the demodulation reference signal index with each of the spreading code indexes are orthogonal to one another. Each spreading code index pattern is generated by cyclic-shifting a spreading code index pattern of the spreading code index pattern used as a reference. In FIG. 16, for each multi-access signature process index, spreading code index pattern 1 (Spreading Code index 1) is generated by cyclic-shifting, by one, spreading code index of spreading code index pattern 0 (Spreading Code index 0) used as a reference. Spreading code index pattern 1 (Spreading Code index 1) is generated by cyclic-shifting, by two, spreading code index of spreading code index pattern 0 used as a reference.

Association of the spreading code index pattern with the cell may be calculated by using the cell ID of each cell. For example, in a case that a result of calculation of Modulo 3 for the cell ID of a cell is 0, the cell is associated with spreading code index pattern 0. In a case that the result of calculation of Modulo 3 for the cell ID of a cell is 1, the cell is associated with spreading code index pattern 1. In a case that the result of calculation of Modulo 3 for the cell ID of a cell is 2, the cell is associated with spreading code index pattern 2.

Each of the base station apparatuses 10, 12 and 14 allocates, in accordance with the look-up table in FIG. 16, the multi-access signature process indexes to the terminal apparatuses 20, 22 and 24 successfully connected to the base station apparatus 10, 12 and 14. Each of the base station apparatuses 10, 12 and 14 transmits, to each terminal apparatus, the configuration information about the grant free access including the multi-access signature process index. Note that each of the base station apparatuses 10, 12 and 14 may transmit, instead of the multi-access signature process index, the configuration information about the grant free access including the demodulation reference signal index.

The controller 208 of each of the terminal apparatuses 20, 22 and 24 acquires the configurations of the spreading code applied to the uplink physical channel and the demodulation reference signal sequence associated with uplink physical channel, in accordance with the look-up table in FIG. 16 based on the multi-access signature process index and the cell ID. The transmitter 210 transmits the uplink physical channel and the demodulation reference signal generated using the spreading code sequence and the demodulation reference signal sequence acquired by the controller 208. For example, in a case that the multi-access signature process index #0 is allocated to both the terminal apparatus 20-1 connected to the base station apparatus 10 and the terminal apparatus 24-1 connected to the base station apparatus 14, the terminal apparatus 20-1 generates a spreading code sequence and a demodulation reference signal sequence based on the demodulation reference signal index and spreading code index pattern 0 associated with the multi-access signature process index #0. On the other hand, the terminal apparatus 24-1 generates a spreading code sequence and a demodulation reference signal sequence based on the demodulation reference signal index and spreading code index pattern 2 associated with the multi-access signature process index #0.

According to the present embodiment, even in a case that the same multi-access signature process index is allocated to terminal apparatuses in neighbor cells, orthogonality can be maintained between the neighbor cells based on combinations of the demodulation reference signals and the spreading codes, thus allowing inter-cell interference to be mitigated.

Fourth Embodiment

The present embodiment is an example in which, in the grant free access, the demodulation reference signal and the spreading code sequence applied to the uplink physical channel are associated with the UE ID. The communication system according to the present embodiment is constituted by the base station apparatus 10 and the terminal apparatus 20 described in FIG. 3, FIG. 10, and FIG. 11. Differences from/additions to the first embodiment to the third embodiment will mainly be described.

FIG. 17 is an example of a table indicating association of the configuration parameters in the grant free access according to the present embodiment. The multi-access signature process index is associated with one demodulation reference signal index, one spreading code index, and one UE ID. The demodulation reference signal indexes are associated with the spreading code indexes so as to make the multi-access signature process indexes unique. The multi-access signature process indexes are associated with the UE IDs on a one-to-one basis. The base station apparatus 10 and the terminal apparatus 20 can uniquely specify (identify) the demodulation reference signal sequence and the spreading code sequence by using the multi-access signature process index (or the UE ID). The base station apparatus 10 and the terminal apparatus 20 can uniquely specify (identify) the spreading code sequence by using the demodulation reference signal index. In FIG. 17, the demodulation reference signal indexes are associated with the demodulation reference signal sequence in accordance with the look-up table in FIG. 9. The spreading code indexes are uniquely associated with the spreading code sequence as is the case with FIG. 8.

In a case that the look-up table in FIG. 17 is indicated by the base station apparatus 10, the controller 208 of the terminal apparatus 20 uses the received UE ID to acquire the configurations of the spreading code applied to the uplink physical channel and the demodulation reference signal sequence associated with the uplink physical channel, based on the look-up table in FIG. 17. The transmitter 210 transmits the uplink physical channel and the demodulation reference signal generated by using the spreading code sequence and the demodulation reference signal sequence acquired by the controller 208.

Within the range of the UE IDs allocated to the terminal apparatuses 20, the channel estimation unit 1122 of the base station apparatus 10 performs identification of the terminal apparatus and channel estimation for signal detection of the uplink physical channel, by using the demodulation reference signal associated with the UE ID, in accordance with the look-up table in FIG. 17. In accordance with the look-up table in FIG. 17, the signal detection unit 1126 performs identification of the terminal apparatus and signal detection of the uplink physical channel, by using the information of the spreading code sequence associated with the demodulation reference signal allocated to the terminal apparatus determined to have transmitted the uplink data (demodulation reference signal having successfully extracted the channel state).

In the present embodiment, in the grant free access, the base station apparatus 10 allocates, to each terminal apparatus, the multi-access signature process index associated with one demodulation reference signal index, one spreading code sequence, and one UE ID, and notifies each terminal apparatus of the UE ID. The base station apparatus 10 and the terminal apparatus 20 can uniquely specify (identify) the demodulation reference signal sequence, the spreading code sequence, and the UE ID by using the multi-access signature process index. The base station apparatus 10 performs identification processing for the terminal apparatus and signal detection processing for the uplink physical channel, by using the demodulation reference signal and the spreading code associated with the UE ID allocated to the terminal apparatus 20. Thus, the grant free access according to the present embodiment allows suppression of an increase in processing loads for identification of each terminal apparatus connected based on the non-orthogonal multiple access and for signal detection for the uplink data, and also allows suppression of a decrease in identification accuracy. Furthermore, the terminal apparatus can specify, using the UE ID, the demodulation reference signal sequence and the spreading code sequence applied to the uplink physical channel. Thus, the communication system according to the present embodiment enables a reduction in overhead resulting from the configuration information about the grant free access.

Fifth Embodiment

The present embodiment is an example in which, in the grant free access, the demodulation reference signal and the spreading code sequence applied to the uplink physical channel are associated with a UE ID group. The communication system according to the present embodiment is constituted by the base station apparatus 10 and the terminal apparatus 20 described in FIG. 3, FIG. 10, and FIG. 11. Differences from/additions to the first embodiment to the fourth embodiment will mainly be described.

FIG. 18 is an example of a table indicating association of the configuration parameters in the grant free access according to the present embodiment. The multi-access signature process index is associated with one demodulation reference signal index, one spreading code index, and one UE ID group. The demodulation reference signal indexes are associated with the spreading code indexes so as to make the multi-access signature process indexes unique. The multi-access signature process indexes are associated with the UE ID groups on a one-to-one basis. The UE ID group includes multiple UE IDs. FIG. 18 is an example in which one UE ID group includes four UE IDs. The base station apparatus 10 and the terminal apparatus 20 can uniquely specify (identify) the demodulation reference signal sequence, the spreading code sequence, and the UE ID group by using the multi-access signature process index. The base station apparatus 10 and the terminal apparatus 20 can uniquely specify (identify) the spreading code sequence and the UE ID group by using the demodulation reference signal index. In FIG. 18, the demodulation reference signal indexes are associated with the demodulation reference signal sequence in accordance with the look-up table in FIG. 9. The spreading code indexes are uniquely associated with the spreading code sequence as is the case with FIG. 8.

The base station apparatus 10 transmits the UE ID allocated to each terminal apparatus. The base station apparatus 10 allocates the multi-access signature process index associated with the UE ID group to which the UE ID belongs, to each terminal apparatus in accordance with the look-up table in FIG. 18. In a case that the look-up table in FIG. 18 is indicated by the base station apparatus 10, the controller 208 of the terminal apparatus 20 uses the received UE ID to acquire the configurations of the spreading code applied to the uplink physical channel and the demodulation reference signal sequence associated with the uplink physical channel, based on the look-up table in FIG. 18. The transmitter 210 generates a demodulation reference signal and an uplink physical channel by using the demodulation reference signal and the spreading code sequence associated with the UE ID group including the UE ID. The transmitter 210 transmits the generated uplink physical channel and demodulation reference signal. The base station apparatus 10 can also transmit, to each terminal apparatus, the configuration information about the grant free access including the multi-access signature process index. The base station apparatus 10 may transmit, instead of the multi-access signature process index, the configuration information about the grant free access including the demodulation reference signal index/UE ID group.

The higher layer processing unit 206 of the terminal apparatus 20 uses the UE ID to scramble the CRC added to the uplink shared channel. The controller 208 of each of the terminal apparatus 20 acquires the configurations of the spreading code applied to the uplink physical channel and the demodulation reference signal sequence associated with uplink physical channel, in accordance with the look-up table in FIG. 18 based on the multi-access signature process index. The transmitter 210 transmits the uplink physical channel and the demodulation reference signal generated using the spreading code sequence and the demodulation reference signal sequence acquired by the controller 208.

Within the range of the multi-access signature process indexes allocated to the terminal apparatuses 20, the channel estimation unit 1122 of the base station apparatus 10 performs identification of the terminal apparatus and channel estimation for signal detection of the uplink physical channel, by using the demodulation reference signal in accordance with the look-up table in FIG. 18. In accordance with the look-up table in FIG. 18, the signal detection unit 1126 performs identification of the terminal apparatus and signal detection of the uplink physical channel, by using the spreading code sequence associated with the demodulation reference signal allocated to the terminal apparatus determined to have transmitted the uplink data (demodulation reference signal having successfully extracted the channel state). The higher layer processing unit 102 of the base station apparatus 10 uses the UE ID associated with the demodulation reference signal having successfully extracted the channel state to perform descramble processing on the CRC included in the decoded uplink data (bit sequence resulting from the hard decision) output from the signal detection unit 1126. For example, in a case that the channel state has been successfully extracted using the demodulation reference signal index #0, the higher layer processing unit 102 performs descramble processing by using the UE IDs #0 to #3 included in the UE ID group #0 associated with the demodulation reference signal index #0. In a case that error detection based on the descrambling results in detection of no error in the uplink data, the higher layer processing unit 102 determines that the identification of the terminal apparatus has been correctly completed and that the uplink data transmitted from the terminal apparatus has been correctly received.

In the present embodiment, in the grant free access, the multi-access signature process index associated with one demodulation reference signal index and/or one spreading code index is associated with the UE ID group. The base station apparatus 10 and the terminal apparatus 20 can uniquely specify (identify) the demodulation reference signal sequence, the spreading code sequence, and the UE ID group by using the multi-access signature process index. The UE ID group is associated with multiple UE IDs. Thus, the base station apparatus according to the present embodiment may limit, in descrambling of the CRC, the error detection processing to the UE IDs included in the UE ID group, allowing suppression of an increase in processing loads for identification of each terminal apparatus and signal detection for the uplink data in the grant free access. Note that the base station apparatus 10 may generate configuration information used for the grant free access through selection from the look-up tables in FIG. 6, FIG. 8, FIG. 10, FIG. 14, and FIG. 16 to FIG. 18.

A program running on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiment may be partially enabled by a computer. In that case, a program for realizing the functions of the embodiments may be recorded in a computer readable recording medium. The program recorded in the recording medium may be realized by being loaded into a computer system for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a processor of known type, a controller, a microcontroller, or a state machine instead. The above-mentioned electric circuits may be constituted by digital circuits, or may be constituted by analog circuits. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-191057 filed on Sep. 29, 2016, and all the contents of JP 2016-191057 are incorporated in the present international application by reference.

REFERENCE SIGNS LIST 10, 12 and 14 Base station apparatus
20-1 to 20-n1, 22-1 to 22-n2, 24-1 to 24-n3 Terminal apparatus
10a Range in which the base station apparatus 10 can connect to the terminal apparatuses
12a Range in which the base station apparatus 12 can connect to the terminal apparatuses
14a Range in which the base station apparatus 14 can connect to the terminal apparatuses
102 Higher layer processing unit
104 Transmitter
106 Transmit antenna
108 Controller
110 Receive antenna
112 Receiver
1040 Coding unit
1042 Modulating unit
1044 Multiplexing unit
1046 Downlink control signal generation unit
1048 Downlink reference signal generation unit
1050 Radio transmitting unit
1120 Radio receiving unit
1122 Channel estimation unit
1124 Demultiplexing unit
1126 Signal detection unit
1502 Cancellation unit
1504 Equalization unit
1506-1 to 1506-$u$ Despreading unit
1508-1 to 1508-$u$ IDFT unit
1510-1 to 1510-$u$ Demodulation unit
1512-1 to 1512-$u$ Decoding unit
1514 Replica generation unit
202 Receive antenna
204 Receiver
206 Higher layer processing unit
208 Controller
210 Transmitter
212 Transmit antenna
2100 Coding unit
2102 Modulating unit
2104 DFT unit
2106 Spreading unit
2108 Multiplexing unit
2110 Radio transmitting unit
2112 Uplink reference signal generation unit
2040 Radio receiving unit
2042 Demultiplexing unit
2044 Demodulation unit
2046 Decoding unit

The invention claimed is:

1. A terminal apparatus for communicating with a base station apparatus, the terminal apparatus comprising:
a receiver configured to receive a multi-access signature process index from the base station apparatus; and
a transmitter configured to transmit a demodulation reference signal and an uplink physical channel, wherein
the multi-access signature process index associates one demodulation reference signal with multiple spreading code sequences, the transmitter transmits the uplink physical channel multiplied by one spreading code sequence selected from the multiple spreading code sequences, and
the spreading code sequence by which the uplink physical channel is multiplied during retransmission is different from the spreading code sequence by which the uplink physical channel is multiplied during initial transmission.

2. The terminal apparatus according to claim 1, wherein
the multi-access signature process index associates one demodulation reference signal with multiple spreading code sequences, the transmitter transmits the uplink physical channel multiplied by one spreading code sequence selected from the multiple spreading code sequences, and
the spreading code sequence by which the uplink physical channel is multiplied during retransmission is different from the spreading code sequence by which the uplink physical channel is multiplied during initial transmission.

3. The terminal apparatus according to claim 1, wherein the receiver receives a UE ID from the base station apparatus, the multi-access signature process index indicates the mark identifying the uplink physical channel, a UE ID group, and association, and the UE ID group comprises multiple UE IDs including the UE ID.

4. A communication method for a terminal apparatus for communicating with a base station apparatus, the communication method comprising:

a first step of receiving a multi-access signature process index from the base station apparatus; and a second step of transmitting a demodulation reference signal and an uplink physical channel, wherein the multi-access signature process index associates one demodulation reference signal with multiple spreading code sequences, the transmitter transmits the uplink physical channel multiplied by one spreading code sequence selected from the multiple spreading code sequences, and the spreading code sequence by which the uplink physical channel is multiplied during retransmission is different from the spreading code sequence by which the uplink physical channel is multiplied during initial transmission.

5. A base station apparatus for communicating with a terminal apparatus, the base station apparatus comprising:

a transmitter configured to transmit a multi-access signature process index to the terminal apparatus and a receiver configured to receive a demodulation reference signal and an uplink physical channel, wherein the multi-access signature process index associates one demodulation reference signal with multiple spreading code sequences, the transmitter transmits the uplink physical channel multiplied by one spreading code sequence selected from the multiple spreading code sequences, and the spreading code sequence by which the uplink physical channel is multiplied during retransmission is different from the spreading code sequence by which the uplink physical channel is multiplied during initial transmission.

6. A communication method for a base station apparatus for communicating with a terminal apparatus, the communication method comprising:

a first step of transmitting a multi-access signature process index to the terminal apparatus; and a second step of receiving a demodulation reference signal and an uplink physical channel, wherein the multi-access signature process index associates one demodulation reference signal with multiple spreading code sequences, the transmitter transmits the uplink physical channel multiplied by one spreading code sequence selected from the multiple spreading code sequences, and the spreading code sequence by which the uplink physical channel is multiplied during retransmission is different from the spreading code sequence by which the uplink physical channel is multiplied during initial transmission.

* * * * *